United States Patent
Sato et al.

(10) Patent No.: US 10,594,996 B2
(45) Date of Patent: Mar. 17, 2020

(54) IMAGE PROCESSING APPARATUS, IMAGE PICKUP DEVICE, IMAGE PICKUP APPARATUS, AND IMAGE PROCESSING METHOD

(71) Applicant: Sony Semiconductor Solutions Corporation, Kanagawa (JP)

(72) Inventors: Yasushi Sato, Kanagawa (JP); Koji Kurata, Tokyo (JP); Yuta Okano, Tokyo (JP); Shin Yoshimura, Kanagawa (JP); Tamaki Eyama, Tokyo (JP); Ryuhei Hata, Kanagawa (JP); Masatsugu Fukunaga, Kanagawa (JP); Masahiro Ito, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 245 days.

(21) Appl. No.: 15/504,680

(22) PCT Filed: Jul. 9, 2015

(86) PCT No.: PCT/JP2015/069745
§ 371 (c)(1),
(2) Date: Feb. 17, 2017

(87) PCT Pub. No.: WO2016/047240
PCT Pub. Date: Mar. 31, 2016

(65) Prior Publication Data
US 2017/0280122 A1    Sep. 28, 2017

(30) Foreign Application Priority Data
Sep. 24, 2014 (JP) .................. 2014-193562

(51) Int. Cl.
*H04N 9/77* (2006.01)
*H04N 9/07* (2006.01)
(Continued)

(52) U.S. Cl.
CPC ............. *H04N 9/77* (2013.01); *H04N 5/2354* (2013.01); *H04N 5/332* (2013.01); *H04N 9/045* (2013.01);
(Continued)

(58) Field of Classification Search
None
See application file for complete search history.

(56) References Cited

U.S. PATENT DOCUMENTS

| 4,007,481 A | 2/1977 | St. John |
| 6,902,527 B1 | 6/2005 | Doguchi et al. |

(Continued)

FOREIGN PATENT DOCUMENTS

| JP | 2008-289000 A | 11/2008 |
| JP | 2008-289001 A | 11/2008 |

(Continued)

OTHER PUBLICATIONS

Written Opinion and English translation thereof dated Sep. 29, 2015 in connection with International Application No. PCT/JP2015/069745.
(Continued)

*Primary Examiner* — Heather R Jones
(74) *Attorney, Agent, or Firm* — Wolf, Greenfield & Sacks, P.C.

(57) ABSTRACT

An image processing apparatus includes a separation unit, a Bayer image signal supply unit, and a signal processing unit. The separation unit separates and removes, in input image signals in which pixel signals each including an invisible light component are arranged in an array different from a Bayer array, the invisible light components from the pixel signals. The Bayer image signal supply unit arranges the pixel signals from which the invisible light components have been removed in the Bayer array and supplies the pixel
(Continued)

signals as Bayer image signals. The signal processing unit subjects the Bayer image signals to predetermined signal processing.

8 Claims, 20 Drawing Sheets

(51) Int. Cl.
    *H04N 5/235*     (2006.01)
    *H04N 5/33*     (2006.01)
    *H04N 9/04*     (2006.01)

(52) U.S. Cl.
    CPC ......... *H04N 9/07* (2013.01); *H04N 2209/046* (2013.01)

(56) References Cited

U.S. PATENT DOCUMENTS

| | | |
|---|---|---|
| 7,006,727 B2 | 2/2006 | Morey et al. |
| 7,258,663 B2 | 8/2007 | Doguchi et al. |
| 7,733,380 B1 | 6/2010 | Cote et al. |
| 8,135,068 B1 | 3/2012 | Alvarez et al. |
| 8,369,640 B2 | 2/2013 | Ishiga |
| 8,665,340 B2 | 3/2014 | Prentice et al. |
| 8,675,982 B2 | 3/2014 | Ishiga |
| 9,699,429 B2 | 7/2017 | Kaizu |
| 9,784,887 B1 | 10/2017 | Ulmer et al. |
| 10,110,825 B2 | 10/2018 | Kurata et al. |
| 2002/0131702 A1 | 9/2002 | Morey et al. |
| 2002/0191266 A1 | 12/2002 | Melloni et al. |
| 2003/0231885 A1 | 12/2003 | Kato et al. |
| 2004/0143157 A1 | 7/2004 | Doguchi et al. |
| 2005/0213883 A1 | 9/2005 | Welch et al. |
| 2006/0221218 A1 | 10/2006 | Adler et al. |
| 2008/0021272 A1 | 1/2008 | Doguchi et al. |
| 2008/0180557 A1 | 7/2008 | Egawa et al. |
| 2009/0290067 A1 | 11/2009 | Ishiga |
| 2010/0239245 A1 | 9/2010 | Yao |
| 2010/0245616 A1 | 9/2010 | Yoshino et al. |
| 2010/0283866 A1 | 11/2010 | Numata |
| 2011/0050918 A1* | 3/2011 | Tachi ............... H04N 5/217 348/208.4 |
| 2011/0063451 A1 | 3/2011 | Kamon et al. |
| 2011/0267492 A1 | 11/2011 | Prentice et al. |
| 2013/0163895 A1 | 6/2013 | Ishiga |
| 2013/0208110 A1* | 8/2013 | Wang ............... H04N 5/2353 348/143 |
| 2013/0272605 A1 | 10/2013 | Saito et al. |
| 2014/0132796 A1 | 5/2014 | Prentice et al. |
| 2014/0210964 A1 | 7/2014 | Muijs et al. |
| 2017/0220000 A1 | 8/2017 | Ozcan et al. |
| 2017/0257584 A1 | 9/2017 | Fujita |
| 2017/0276954 A1 | 9/2017 | Bajorins et al. |
| 2017/0366723 A1 | 12/2017 | Kurata et al. |
| 2018/0041719 A1 | 2/2018 | Kurata et al. |

FOREIGN PATENT DOCUMENTS

| | | |
|---|---|---|
| JP | 2010-206436 A | 9/2010 |
| JP | 2010-227254 A | 10/2010 |
| JP | 5100615 B2 | 5/2012 |
| JP | 2013-081245 A | 5/2013 |
| JP | 2013-219705 A | 10/2013 |
| JP | 2013-255144 A | 12/2013 |
| WO | WO 2011/001672 A1 | 1/2011 |
| WO | WO 2013/183330 A1 | 12/2013 |

OTHER PUBLICATIONS

International Preliminary Report on Patentability and English translation thereof dated Apr. 6, 2017 in connection with International Application No. PCT/JP2015/069745.
U.S. Appl. No. 15/534,679, filed Jun. 9, 2017, Kurata et al.
U.S. Appl. No. 15/552,025, filed Aug. 18, 2017, Kurata et al.
International Search Report and Written Opinion and English translation thereof dated Mar. 15, 2016 in connection with International Application No. PCT/JP2016/054144.
International Preliminary Report on Patentability and English translation thereof dated Sep. 8, 2017 in connection with International Application No. PCT/JP2016/054144.
International Search Report and Written Opinion and English translation thereof dated Mar. 1, 2016 in connection with International Application No. PCT/JP2015/084390.
International Preliminary Report on Patentability and English translation thereof dated Jun. 29, 2017 in connection with International Application No. PCT/JP2015/084390.
International Search Report and Written Opinion and English translation thereof dated Sep. 29, 2015 in connection with International Application No. PCT/JP2015/069745.
Ramirez et al., "Property of images in Bayer formats in the Digital Processing of Images," Electronics, Robotics and Automotive Mechanics Conference 2008, IEEE Computer Society, pp. 267-271 ( DOI: 10.1109/CERMA.2008.9).

\* cited by examiner

FIG.14

IMAGE PROCESSING APPARATUS, IMAGE PICKUP DEVICE, IMAGE PICKUP APPARATUS, AND IMAGE PROCESSING METHOD

CROSS-REFERENCE TO RELATED APPLICATIONS

This application is a U.S. National Stage Entry under 35 U.S.C. § 371 of International Application No. PCT/JP2015/069745, filed in the Japanese Patent Office on Jul. 9, 2015, which claims priority to Japanese Patent Application No. JP2014-193562, filed in the Japanese Patent Office on Sep. 24, 2014, each of which is incorporated by reference herein in its entirety.

TECHNICAL FIELD

The present technology relates to an image processing apparatus, an image pickup device, an image pickup apparatus, and an image processing method, more particularly, to an image processing apparatus, an image pickup device, an image pickup apparatus, and an image processing method for separating invisible light.

BACKGROUND ART

From the past, a function of measuring peripheral brightness, capturing an image with improved luminance by infrared light when dark, and capturing an image from which components of infrared light are removed when bright is equipped in image pickup apparatuses such as a monitoring camera in many cases. Such a function is generally called Day & Night function.

For example, there is proposed an image pickup apparatus that separates and removes, by image processing that involves subjecting a plurality of pixel signals to weighted addition, components of invisible light (infrared light etc.) of those signals when the periphery is bright (see, for example, Patent Literature 1). This image pickup apparatus includes an image pickup device, a subtraction unit, and a signal processing unit and carries out, after removing the components of invisible light by the subtraction unit, white balance processing, de-mosaic processing, and the like by the signal processing unit.

CITATION LIST

Patent Literature

Patent Literature 1: Japanese Patent Application Laid-open No. 2008-289000

DISCLOSURE OF INVENTION

Technical Problem

In the technology of the past described above, the subtraction unit generates image signals using a non-Bayer array different from a Bayer array and inputs the signals to the subsequent signal processing unit. Therefore, the signal processing unit includes a circuit that is dedicated to the non-Bayer array and is different from a general circuit that processes image signals having a Bayer array. With such a configuration, design changes of the subtraction unit also influence the signal processing unit, with the result that a problem in which design and development loads of an apparatus that processes images increase arises.

The present technology has been made in view of the circumstances as described above and aims at facilitating design and development of an apparatus that processes images.

Solution to Problem

The present technology has been made to solve the problem described above. According to a first aspect of the present technology, there is provided an image processing apparatus including: a separation unit that separates and removes, in input image signals in which pixel signals each including an invisible light component are arranged in an array different from a Bayer array, the invisible light components from the pixel signals; a Bayer image signal supply unit that arranges the pixel signals from which the invisible light components have been removed in the Bayer array and supplies the pixel signals as Bayer image signals; and a signal processing unit that subjects the Bayer image signals to predetermined signal processing, and an image processing method. Accordingly, an operation that the pixel signals from which the invisible light components have been removed are arranged in the Bayer array and subjected to signal processing can be obtained.

Further, according to the first aspect, the pixel signals may each include one of a plurality of color signals, and the separation unit may include an all-color interpolation filter that sequentially focuses on the pixel signals in the input image signals and interpolates the plurality of color signals from a predetermined number of pixel signals in the periphery of the focused pixel signal, and an invisible light component separation unit that separates and removes the invisible light components by performing weighted addition of the plurality of color signals for each of the pixel signals in which the plurality of color signals are interpolated. Accordingly, an operation that the invisible light components are removed by the weighted addition of the plurality of color signals for each of the pixel signals can be obtained.

Further, according to the first aspect, the image processing apparatus may further include: a specific color interpolation filter that sequentially focuses on the pixel signals in the input image signals and interpolates a specific color signal out of the plurality of color signals from the pixel signals smaller in number than the predetermined number of pixel signals in the periphery of the focused pixel signal; a high frequency component extraction unit that extracts, as high frequency components, differences between the pixel signals in which the specific color signal is interpolated and the specific color signal in the pixel signals in which the plurality of color signals are interpolated; and a high frequency component restoration unit that restores the high frequency components in the pixel signals from which the invisible light components have been removed and supplies the pixel signals to the Bayer array image supply unit. Accordingly, an operation that the high frequency components are restored in the pixel signals from which the invisible light components have been removed can be obtained.

Further, according to the first aspect, the image processing apparatus may further include: a YC conversion unit that converts, for each of the pixel signals from which the invisible light components have been removed, the plurality of color signals into a luminance signal and color difference signals; a color difference signal correction unit that corrects the color difference signals by a gain corresponding to a photometric amount measured in the periphery of the image processing apparatus; and a reverse conversion unit that converts the corrected color difference signals and the luminance signal into the plurality of color signals and supplies the color signals to the Bayer image signal supply unit. Accordingly, an operation that color difference signals are corrected by a gain corresponding to the photometric amount can be obtained.

Further, according to the first aspect, the image processing apparatus may further include: a YC conversion unit that converts, for each of the pixel signals from which the invisible light components have been removed, the plurality of color signals into a luminance signal and color difference signals; a luminance signal synthesis unit that synthesizes the specific color signal of the pixel signals in which the plurality of color signals are interpolated with the luminance signal by a synthesis ratio corresponding to a photometric amount measured in the periphery of the image processing apparatus; and a reverse conversion unit that converts the color difference signals and the luminance signal synthesized with the specific color signal into the plurality of color signals and supplies the color signals to the Bayer image signal supply unit. Accordingly, an operation that the specific color signal is synthesized with the luminance signals by a synthesis ratio corresponding to the photometric amount can be obtained.

Further, according to a second aspect of the present technology, there is provided an image pickup device, including: an image pickup unit that captures input image signals in which pixel signals each including an invisible light component are arranged in an array different from a Bayer array; a separation unit that separates and removes the invisible light components from the pixel signals in the input image signals; and a Bayer image signal supply unit that arranges the pixel signals from which the invisible light components have been removed in the Bayer array and supplies the pixel signals as Bayer image signals. Accordingly, an operation that the pixel signals from which the invisible light components have been removed are arranged in the Bayer array and subjected to signal processing can be obtained.

Further, according to the second aspect, the image pickup device may further include a signal processing unit that subjects the Bayer image signals to predetermined signal processing. Accordingly, an operation that the Bayer image signals are subjected to the predetermined signal processing can be obtained.

Further, according to the second aspect of the present technology, there is provided an image pickup apparatus, including: an image pickup unit that captures input image signals in which pixel signals each including an invisible light component are arranged in an array different from a Bayer array; a separation unit that separates and removes the invisible light components from the pixel signals in the input image signals; a Bayer image signal supply unit that arranges the pixel signals from which the invisible light components have been removed in the Bayer array and supplies the pixel signals as Bayer image signals; and a signal processing unit that subjects the Bayer image signals to predetermined signal processing. Accordingly, an operation that the pixel signals in which the invisible light components have been removed from color components are arranged in the Bayer array and subjected to signal processing while improving an S/N (Signal to Noise) ratio of luminance signals using the invisible light components can be obtained.

ADVANTAGEOUS EFFECTS OF INVENTION

According to the present technology, an excellent effect that the function of removing invisible light components can be mounted with ease can be obtained. It should be noted that the effects described herein are not necessarily limited, and any effect described in the present disclosure may be obtained.

BRIEF DESCRIPTION OF DRAWINGS

FIG. 14 Diagrams showing examples of color signals obtained after infrared light separation according to the first embodiment.

MODES FOR CARRYING OUT THE INVENTION

Hereinafter, modes for embodying the present technology (hereinafter, referred to as embodiments) will be described. Descriptions will be given in the following order.

1. First embodiment (example of separating infrared light and converting it into Bayer image)
2. Second embodiment (example of separating infrared light and converting it into Bayer image in image pickup device)
3. Third embodiment (example of separating infrared light, converting it into Bayer image, and subjecting it to signal processing in image pickup device)

<1. First Embodiment>

[Configuration Example of Image Pickup Apparatus]

Figure 1:
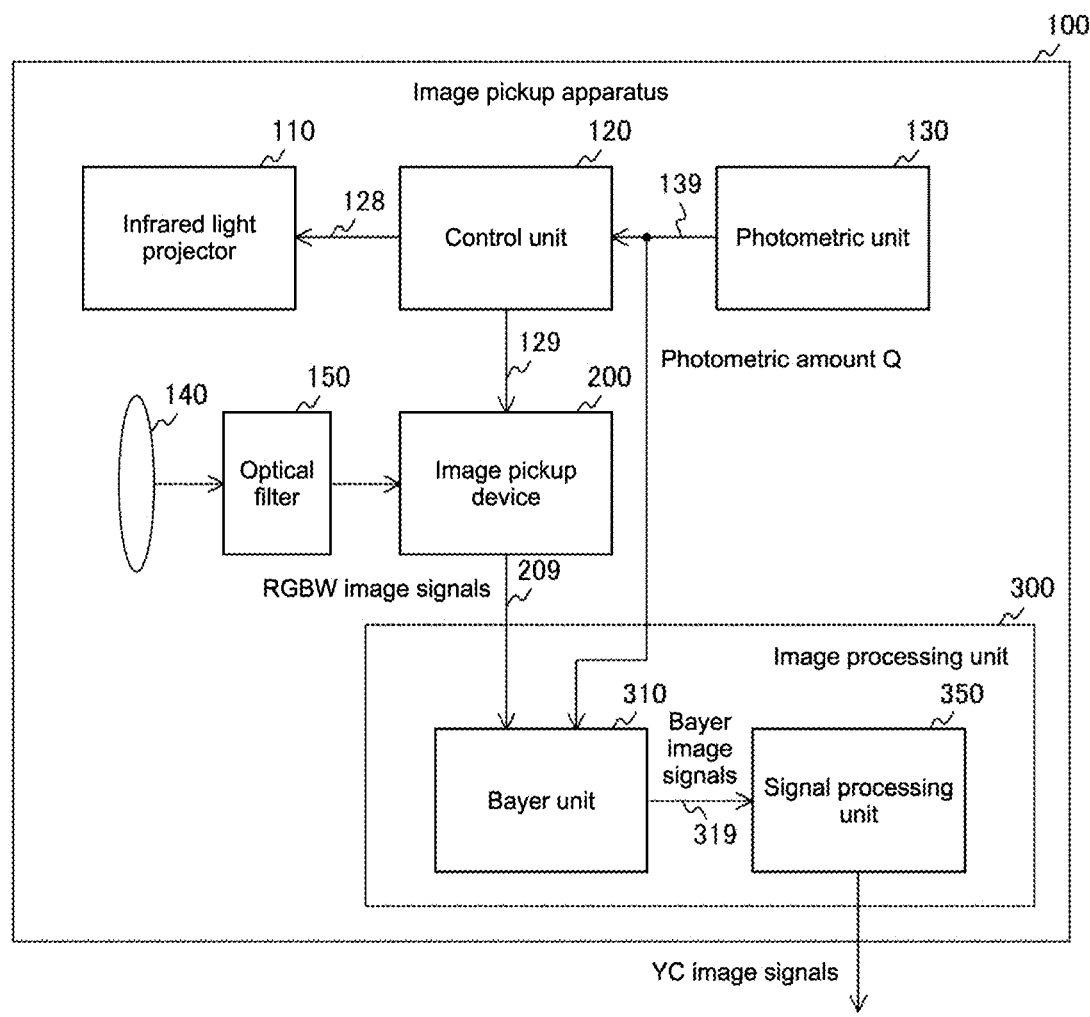
FIG. 1 A block diagram showing a configuration example of an image pickup apparatus according to a first embodiment.

FIG. 1 is a block diagram showing a configuration example of an image pickup apparatus 100 according to a first embodiment. The image pickup apparatus 100 includes an infrared light projector 110, a control unit 120, a photometric unit 130, an image pickup lens 140, an optical filter 150, an image pickup device 200, and an image processing unit 300. Further, the image processing unit 300 includes a Bayer unit 310 and a signal processing unit 350.

The infrared light projector 110 irradiates infrared light onto an object under control of the control unit 120.

The control unit 120 controls the entire image pickup apparatus 100. The control unit 120 controls the image pickup device 200 to generate image signals according to user operations and the like. The control unit 120 generates a vertical synchronization signal VSYNC that indicates an image pickup timing, for example, and supplies it to the image pickup device 200 via a signal line 129. The control unit 120 also acquires a photometric amount Q measured by the photometric unit 130. When the photometric amount Q is equal to or larger than a predetermined threshold value, the control unit 120 controls the infrared light projector 110 to turn off the light. On the other hand, when the photometric amount Q is smaller than the threshold value, the control unit 120 controls the infrared light projector 110 to turn on the light during image pickup.

The photometric unit 130 measures a brightness around the image pickup apparatus 100. The photometric unit 130 supplies the photometric amount Q to the control unit 120 and the Bayer unit 310 via a signal line 139.

The image pickup lens 140 is a lens that collects light from the object and guides the light to the image pickup device 200 via the optical filter 150. The optical filter 150 transmits visible light and infrared light out of light from the image pickup lens 140. It should be noted that a configuration in which the optical filter 150 may be adopted, but it is desirable to provide the optical filter 150 in view of separating infrared light with high accuracy.

The image pickup device 200 converts light received via the optical filter 150 into electric signals and generates image data. In the image pickup device 200, R (Red) pixels, G (Green) pixels, B (Blue) pixels, and W (White) pixels are arranged in a 2D lattice, for example. The image pickup device 200 AD-converts analog electric signals photoelectrically converted by those pixels to obtain a digital signal for each pixel as a pixel signal. The image pickup device 200 generates image signals including those pixel signals as RGBW image signals. Examples of the image pickup device 200 include a CCD (Charge Coupled Device) sensor and a CMOS (Complementary Metal Oxide Semiconductor) sensor. The image pickup device 200 supplies the generated RGBW image signals to the Bayer unit 310 via a signal line 209.

The Bayer unit 310 removes invisible light components (e.g., infrared light components) from the RGBW image signals to convert the signals into Bayer image signals in which the pixel signals are arranged in a Bayer array. The Bayer unit 310 supplies the Bayer image signals to the signal processing unit 350 via a signal line 319.

The signal processing unit 350 carries out predetermined signal processing such as white balance processing and de-mosaic processing on the Bayer image signals. The signal processing unit 350 converts image signals obtained after the de-mosaic processing into YC image signals including a luminance signal and color difference signal for each pixel and outputs the signals to an apparatus outside the image pickup apparatus 100 (display apparatus etc.).

The Bayer unit 310 and the signal processing unit 350 may either be provided on the same semiconductor chip or different semiconductor chips.

It should be noted that the image processing unit 300 is an example of the image processing apparatus described in the scope of claims.

Further, although the image pickup apparatus 100 outputs the YC image signals to the external apparatus, the configuration is not limited thereto. The image pickup apparatus 100 may further include a recording unit such as a memory so that the YC image signals are recorded onto the recording unit. Further, the image pickup apparatus 100 may further include a display unit such as a liquid crystal monitor so that the YC image signals are displayed on the display unit.

Although the infrared light projector 110, the control unit 120, the photometric unit 130, the image pickup lens 140, the optical filter 150, the image pickup device 200, and the image processing unit 300 are all provided in the image pickup apparatus 100, those may instead be provided dispersedly in a plurality of apparatuses. For example, the control unit 120, the photometric unit 130, the image pickup lens 140, the optical filter 150, the image pickup device 200, and the like may be provided in the image pickup apparatus 100, and the image processing unit 300 may be provided in the image processing apparatus.

Moreover, although the image pickup apparatus 100 includes the infrared light projector 110 so that it is lit when dark, a configuration in which the infrared light projector 110 is not provided may be adopted instead. It should be noted that in view of improving image quality when dark, it is desirable to provide the infrared light projector 110 and light it.

Figure 2:
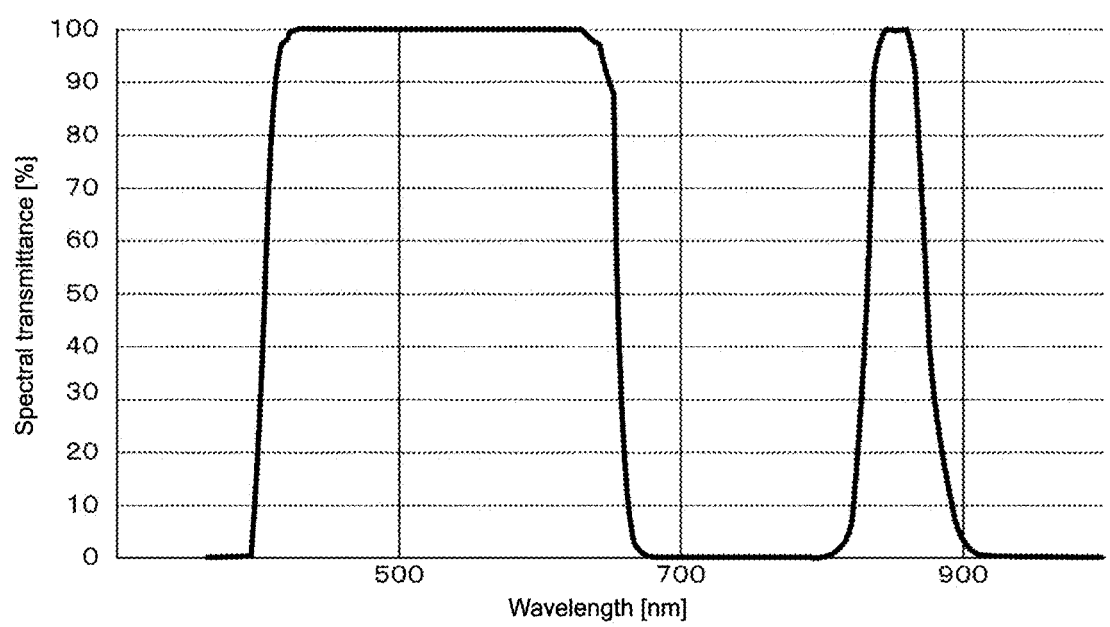
FIG. 2 A graph showing an example of transmission characteristics of an optical filter according to the first embodiment.

FIG. 2 is a graph showing an example of transmission characteristics of the optical filter 150 according to the first embodiment. In the figure, the ordinate axis represents a spectral transmittance of the optical filter 150, and the abscissa axis represents an optical wavelength. As exemplified in the figure, the optical filter 150 transmits visible light having a wavelength range of 380 to 650 nanometers (nm) and infrared light having a wavelength longer than that, for example.

[Configuration Example of Image Pickup Device]

Figure 3:
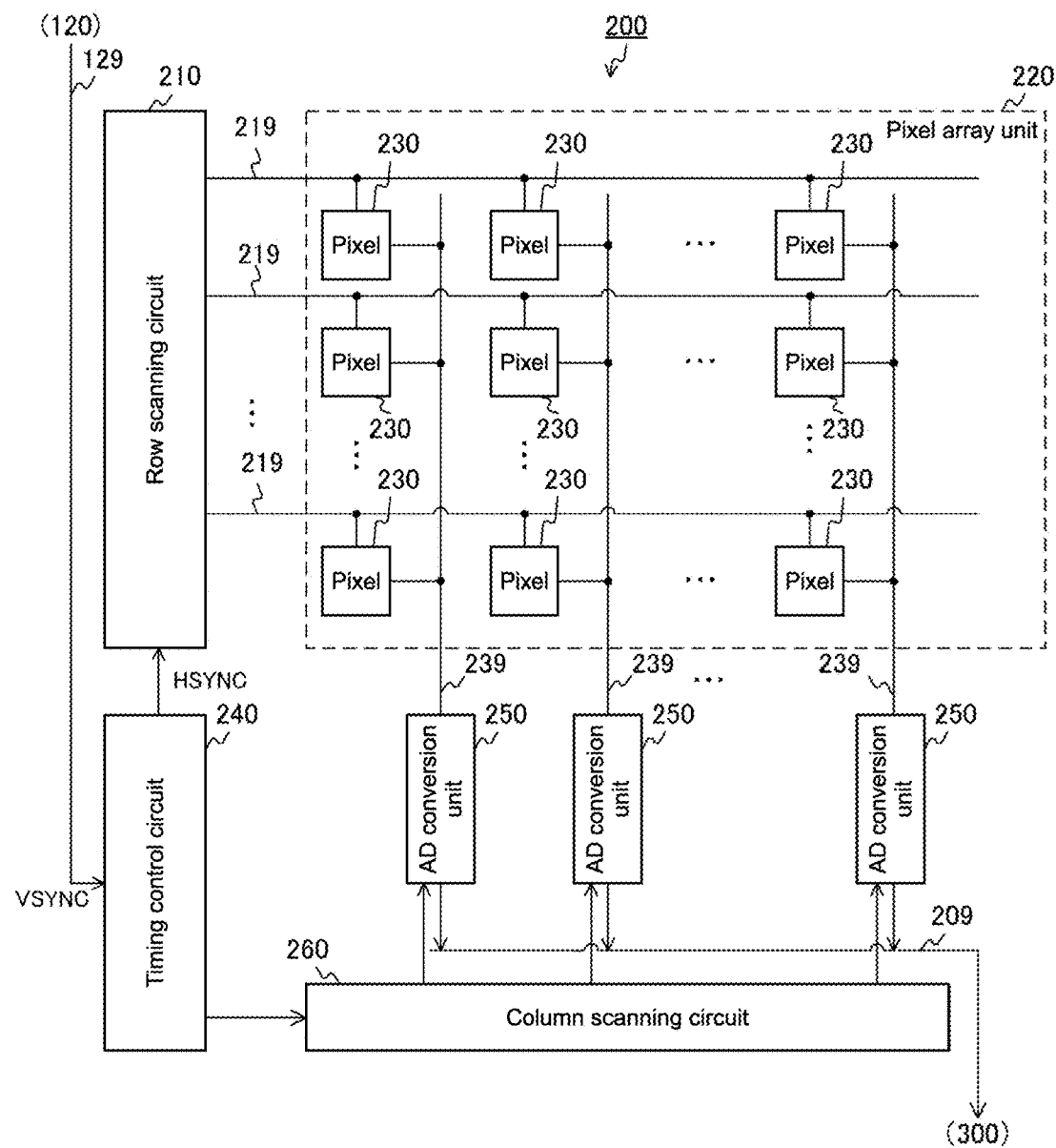
FIG. 3 A block diagram showing a configuration example of an image pickup device according to the first embodiment.

FIG. 3 is a block diagram showing a configuration example of an image pickup device 200 according to the first embodiment. The image pickup device 200 includes a row scanning circuit 210, a pixel array unit 220, a timing control circuit 240, AD (Analog to Digital) conversion units 250, and a column scanning circuit 260. In the pixel array unit 220, a plurality of pixels 230 are arranged in a 2D lattice.

The timing control circuit 240 controls row and column scanning timings. Here, in each of the rows of the pixel array unit 220, the plurality of pixels 230 are arranged in a certain direction, and the row is also called line. In addition, in each of the columns of the pixel array unit 220, the plurality of pixels 230 are arranged in a direction orthogonal to the rows. The pixels 230 of n rows and m columns are arranged in the pixel array unit 220. Here, n and m are each an integer.

The timing control circuit 240 generates a horizontal synchronization signal HSYNC that instructs a row scanning timing in sync with the vertical synchronization signal VSYNC from the control unit 120, and supplies the signal to the row scanning circuit 210. The timing control circuit 240 also generates a timing signal that instructs a column scanning timing in sync with the horizontal synchronization signal HSYNC, and supplies the signal to the column scanning circuit 260.

The row scanning circuit 210 selects each of the rows in sync with the horizontal synchronization signal HSYNC. The row scanning circuit 210 selects each of the rows by sequentially outputting row selection signals to the rows via signal lines 219. Further, every time a row is selected, the row scanning circuit 210 exposes that row for a set exposure period.

The pixels 230 each convert light into an electric signal. The pixels 230 supply the generated electric signals to the AD conversion units 250 via signal lines 239 of the corresponding columns. For example, the R pixels, the G pixels, the B pixels, and the W pixels are provided as the pixels 230.

The AD conversion units 250 AD-convert the electric signals from the pixels 230 and generate digital signals. The AD conversion units 250 are respectively provided in the columns. The AD conversion unit 250 in the column selected by the column scanning circuit 260 supplies the generated digital signals to the image processing unit 300 as pixel signals.

The column scanning circuit 260 selects each of the rows according to the timing signals. The column scanning circuit 260 selects each of the columns by sequentially outputting column selection signals to the corresponding AD conversion units 250 according to the timing signals.

Figure 4:
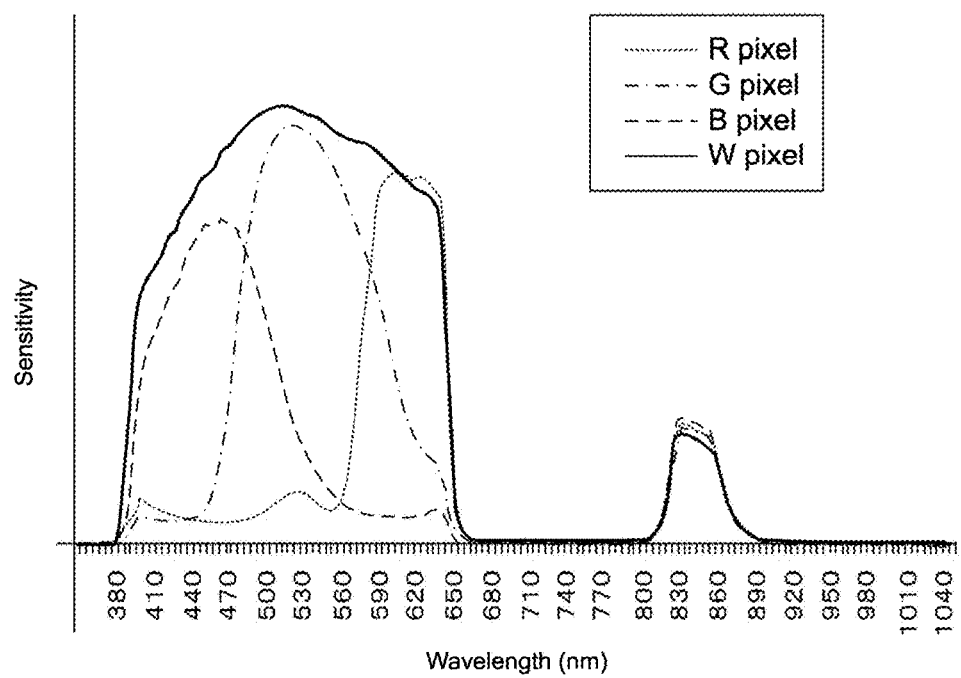
FIG. 4 A graph showing an example of sensitivity characteristics of each pixel according to the first embodiment.

FIG. 4 is a graph showing an example of sensitivity characteristics of each pixel according to the first embodiment. In the figure, the abscissa axis represents an optical wavelength, and the ordinate axis represents a pixel sensitivity with respect to light having that wavelength. In addition, the solid line indicates sensitivity characteristics of W pixels, and the fine dotted line indicates sensitivity characteristics of R pixels. Moreover, the dashed-dotted line indicates sensitivity characteristics of G pixels, and the rough dotted line indicates sensitivity characteristics of B pixels.

The sensitivity of W pixels shows its peak with respect to white visible light. Further, the sensitivities of R pixels, G pixels, and B pixels respectively show peaks with respect to red, green, and blue visible light. The sensitivities of R, G, B, and W pixels with respect to infrared light are of the same level.

[Configuration Example of Bayer Unit]

Figure 5:
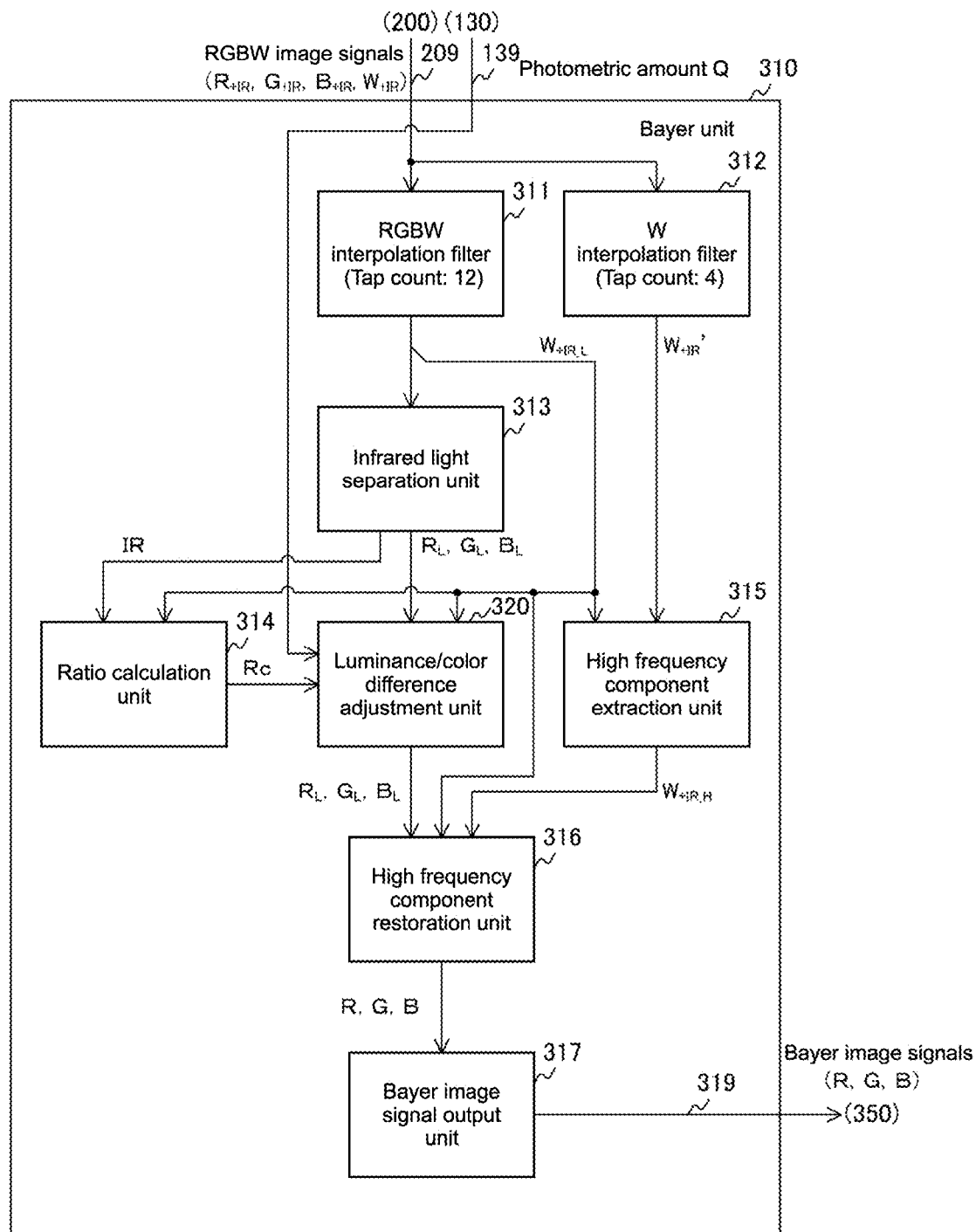
FIG. 5 A block diagram showing a configuration example of a Bayer unit according to the first embodiment.

FIG. 5 is a block diagram showing a configuration example of the Bayer unit 310 according to the first embodiment. The Bayer unit 310 includes an RGBW interpolation filter 311, a W interpolation filter 312, an infrared light separation unit 313, a ratio calculation unit 314, a luminance/color difference adjustment unit 320, a high frequency component extraction unit 315, a high frequency component restoration unit 316, and a Bayer image signal output unit 317.

The RGBW interpolation filter 311 interpolates all color signals for each of the pixel signals in the RGBW image signals. Here, the R pixels, G pixels, B pixels, and W pixels receive infrared light together with visible light and generate pixel signals each including one color signal from the received light. Therefore, the color signals of those pixels include visible light components as signals obtained by photoelectrically converting visible light and infrared light components as signals obtained by photoelectrically converting infrared light. Therefore, the color signals of the R pixels, G pixels, B pixels, and W pixels obtained before separating infrared light components will hereinafter be referred to as "$R_{+IR}$", "$G_{+IR}$", "$B_{+IR}$", and "$W_{+IR}$", respectively. "+IR" as a suffix indicates that infrared light components are included in the color signals. The RGBW interpolation filter 311 sequentially focuses on the pixel signals and interpolates, with the focused pixel signal being an interpolation target, the color signal using pixel signals in the periphery thereof with use of the following expression, for example.

[Expression 1]
$$R_{+IR\_L} = \sum_{i=0}^{M} R_{+IR\_i} \times k_i \qquad \text{Expression 1}$$

[Expression 2]
$$G_{+IR\_L} = \sum_{i=0}^{M} G_{+IR\_i} \times k_i \qquad \text{Expression 2}$$

[Expression 3]
$$B_{+IR\_L} = \sum_{i=0}^{M} B_{+IR\_i} \times k_i \qquad \text{Expression 3}$$

[Expression 4]
$$W_{+IR\_L} = \sum_{i=0}^{M} W_{+IR\_i} \times k_i \qquad \text{Expression 4}$$

In Expressions 1 to 4, M represents the number of pixel signals used for the interpolation. This M will hereinafter be referred to as "tap count". i is an integer of 0 to M−1 and indicates a number for identifying the pixel signal used for the interpolation. The left-hand side shows the pixel signal after the interpolation. Further, $k_i$ is a coefficient of an actual number. The value of the coefficient $k_i$ becomes larger as a distance between the pixel signal relevant to i and the interpolation target becomes smaller, and the same value is set when the distances are the same. For example, in a case where $R_{+IR\_0}$ to $R_{+IR\_3}$ on left- and right-hand sides and above and below the interpolation target are used for the interpolation, the distances thereof from the interpolation target are the same. Therefore, "¼" is set for all coefficients $k_0$ to $k_3$.

The RGBW interpolation filter 311 supplies the interpolated $R_{+IR\_L}$ signal, $G_{+IR\_L}$ signal, and $B_{+IR\_L}$ signal to the infrared light separation unit 313 and supplies the $W_{+IR\_L}$ signal to the infrared light separation unit 313, the ratio calculation unit 314, the high frequency component extraction unit 315, the high frequency component restoration unit 316, and the luminance/color difference adjustment unit 320.

It should be noted that the RGBW interpolation filter 311 is an example of the all-color interpolation filter descried in the scope of claims.

The W interpolation filter 312 interpolates only the $W_{+IR}$ signal for each of the pixel signals in the RGBW image signals. The W interpolation filter 312 interpolates the $W_{+IR}$ signal using Expression 4 or the like. It should be noted that in the pixel signals of the W pixels, it is unnecessary to perform interpolation from peripheral pixel signals. Moreover, the value of the tap count M of the W interpolation filter 312 is set to be smaller than that of the RGBW interpolation filter 311. For example, while the tap count M is set to 12 in the RGBW interpolation filter 311, the tap count M is set to 4 in the W interpolation filter 312. The W interpolation filter 312 supplies the interpolated $W_{+IR}'$ signals to the high frequency component extraction unit 315. It should be noted that the W interpolation filter 312 is an example of the specific color interpolation filter described in the scope of claims.

It should be noted that the W interpolation filter 312 may also detect an edge in a specific direction and perform interpolation preferentially using pixel signals along the direction of that edge. For example, the W interpolation filter 312 detects an edge in the horizontal or vertical direction. Then, when an edge in the horizontal direction is detected, the W interpolation filter 312 interpolates by an average of pixel signals above and below the interpolation target, and when an edge in the vertical direction is detected, interpolates by an average of pixel signals on left- and right-hand sides of the interpolation target. Similarly, the RGBW interpolation filter 311 may detect an edge and perform interpolation preferentially using pixel signals along the direction of that edge.

The infrared light separation unit 313 separates and removes infrared light components from each of the $R_{+IR\_L}$ signal, the $G_{+IR\_L}$ signal, and the $B_{+IR\_L}$ signal. This infrared light separation unit 313 separates and removes infrared light components by weighted addition indicated by the following expression, for example.

$$(R_{+IR\_L}+G_{+IR\_L}+B_{+IR\_L}-W_{+IR\_L})/2=IR$$

$$R_{+IR\_L}-IR=R_L$$

$$G_{+IR\_L}-IR=G_L$$

$$B_{+IR\_L}-IR=B_L$$

In these 4 expressions, IR represents an infrared light component. Further, $R_L$, $G_L$, and $B_L$ indicate color signals from which the infrared light components have been removed. The infrared light separation unit 313 supplies the $R_L$, $G_L$, and $B_L$ signals to the luminance/color difference adjustment unit 320. The infrared light separation unit 313 also supplies the separated IR components to the ratio calculation unit 314.

It should be noted that although the infrared light separation unit 313 separates the infrared light components using Expressions 5 to 8, the configuration is not limited thereto. For example, the infrared light separation unit 313 may remove the infrared light components using the following expressions instead of using Expressions 5 to 8.

$$R_L=R_{+IR\_L}\times 0.5+G_{+IR\_L}\times(-0.5)+B_{+IR\_L}\times(-0.5)+W_{+IR\_L}\times 0.5$$

$$G_L=R_{+IR\_L}\times(-0.5)+G_{+IR\_L}\times 0.5+B_{+IR\_L}\times(-0.5)+W_{+IR\_L}\times 0.5$$

$$B_L=R_{+IR\_L}\times(-0.5)+G_{+IR\_L}\times(-0.5)+B_{+IR\_L}\times(-0.5)+W_{+IR\_L}\times 0.5$$

$$W_L=R_{+IR\_L}\times 0.5+G_{+IR\_L}\times 0.5+B_{+IR\_L}\times 0.5+W_{+IR\_L}\times(-0.5)$$

Further, although the infrared light separation unit 313 separates infrared light from the RGBW image signals, the infrared light separation unit 313 may also separate infrared light from image signals other than the RGBW image signals. For example, the infrared light separation unit 313 may separate infrared light from an image signal in which one complementary color pixel, two elementary color pixels, and one W pixel are arranged. Regarding arrangement of pixels excluding RGBW pixels and a calculation method for separating infrared light, those described in, for example, Japanese Patent Application Laid-open No. 2008-289000 can be used.

Further, although the infrared light separation unit 313 separates and removes the infrared light components IR, invisible light (ultraviolet light etc.) components excluding infrared light may be separated and removed, or invisible light components excluding infrared light may be separated in addition to infrared light. In this case, a configuration in which a filter that transmits invisible light to be separated is provided as the optical filter 150 or a configuration in which the optical filter 150 is not provided only needs to be adopted.

It should be noted that the RGBW interpolation filter 311 and the infrared light separation unit 313 are an example of the separation unit described in the scope of claims. In addition, the infrared light separation unit 313 is an example of the invisible light component separation unit described in the scope of claims.

The ratio calculation unit 314 calculates a visible light ratio Rc that indicates a ratio of visible light components in a pixel signal. The ratio calculation unit 314 calculates the visible light ratio Rc using the following expressions, for example, and supplies it to the luminance/color difference adjustment unit 320.

[Expression 5]

$$IR_{av}=\frac{\sum_{j=0}^{N} IR_j}{N} \qquad \text{Expression 5}$$

[Expression 6]

$$W_{av}=\frac{\sum_{j=0}^{N} W_{L-j}}{N} \qquad \text{Expression 6}$$

$$Rc=(W_{av}-IR_{av})/W_{av}$$

In Expression 5, N represents the number of pixel signals in the image signal. $IR_j$ indicates IR components in a j (j is an integer of 0 to N−1)-th pixel signal. $IR_{av}$ is a mean value of the IR components. In addition, in Expression 6, $W_{L\_j}$ indicates a j-th $W_{+IR\_L}$ signal. $W_{av}$ indicates a mean value of the $W_{+IR\_L}$ signals.

Based on the visible light ratio Rc and the photometric amount Q, the luminance/color difference adjustment unit 320 adjusts luminance signals and color difference signals. The luminance/color difference adjustment unit 320 converts each of the $R_L$, $G_L$, and $B_L$ signals of the respective pixel signals into a luminance signal and a color difference signal for each of the pixel signals. Then, the luminance/color difference adjustment unit 320 adjusts the luminance signals and the color difference signals based on the visible light ratio Rc and the photometric amount Q, converts them back to the $R_L$, $G_L$, and $B_L$ signals, and supplies the signals to the high frequency component restoration unit 316.

The high frequency component extraction unit 315 extracts a difference between the $W_{+IR\_L}$ signal from the RGBW interpolation filter 311 and the $W_{+IR}'$ signal from the W interpolation filter 312 as a high frequency component $W_{+IR\_H}$. As described above, the tap count M of the W interpolation filter 312 is smaller than that of the RGBW interpolation filter 311. Therefore, the $W_{+IR}'$ signal from the W interpolation filter 312 includes a higher frequency component than the $W_{+IR\_L}$ signal from the RGBW interpolation filter 311. Therefore, the high frequency components $W_{+IR\_H}$ can be extracted by obtaining differences among those signals. The high frequency component extraction unit 315 supplies the extracted high frequency components $W_{+IR\_H}$ to the high frequency component restoration unit 316.

The high frequency component restoration unit 316 restores the high frequency components $W_{+IR\_H}$ in the $R_L$, $G_L$, and $B_L$ signals. The high frequency component restoration unit 316 restores the high frequency components $W_{+IR\_H}$ using the following expressions, for example.

$$R = R_L + W_{+IR\_H} \times R_L / W_{+IR\_L}$$

$$G = G_L + W_{+IR\_H} \times G_L / W_{+IR\_L}$$

$$B = R_L + W_{+IR\_H} \times B_L / W_{+IR\_L}$$

In the three expressions, R, G, and B are restored color signals. Due to the interpolation by the RGBW interpolation filter 311, high frequency components are lost, and image quality is lowered in that state. However, since the high frequency components are restored in the high frequency component restoration unit 316, the image quality is improved as compared to the case where the high frequency components are not restored. The high frequency component restoration unit 316 supplies the restored R, G, and B signals to the Bayer image signal output unit 317.

The Bayer image signal output unit 317 arranges the R, G, and B signals in a Bayer array and outputs the signals to the signal processing unit 350 as Bayer image signals. It should be noted that the Bayer image signal output unit 317 is an example of the Bayer image signal supply unit described in the scope of claims.

It should be noted that although the high frequency components are extracted and restored by the W interpolation filter 312, the high frequency component extraction unit 315, and the high frequency component restoration unit 316, a configuration in which these units are not provided may be adopted. However, it is desirable to provide the W interpolation filter 312, the high frequency component extraction unit 315, and the high frequency component restoration unit 316 in view of improving image quality.

Further, although the ratio calculation unit 314 and the luminance/color difference adjustment unit 320 are provided in the Bayer unit 310, these units may instead be provided in the subsequent signal processing unit 350. However, it is desirable to provide the ratio calculation unit 314 and the luminance/color difference adjustment unit 320 in the Bayer unit 310 in view of improving image quality.

Figure 6:
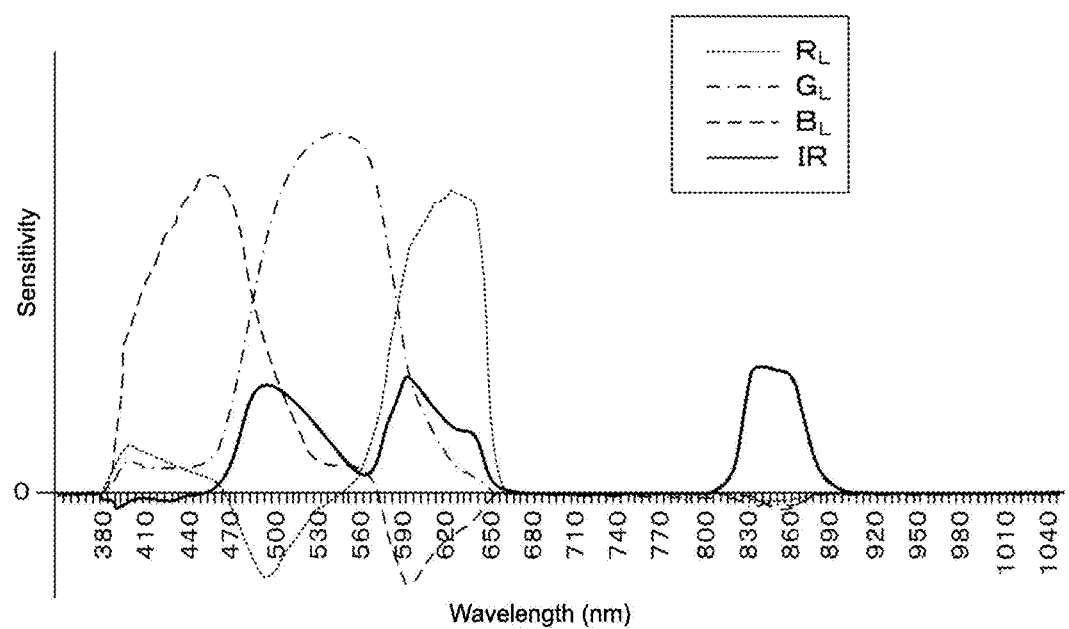
FIG. 6 A diagram showing an example of sensitivity characteristics obtained after infrared light separation according to the first embodiment.

FIG. 6 is a graph showing an example of sensitivity characteristics obtained after infrared light separation according to the first embodiment. In the figure, the abscissa axis represents an optical wavelength, and the ordinate axis represents a pixel sensitivity with respect to light at that wavelength. In actuality, infrared light components and visible light components are separated from the pixel signals instead of sensitivity, but these components express sensitivities in the figure. In the figure, the solid line indicates sensitivity characteristics of the infrared light component IR, and the fine dotted line indicates sensitivity characteristics of the $R_L$ signal. Moreover, the dashed-dotted line indicates sensitivity characteristics of the $G_L$ signal, and the rough dotted line indicates sensitivity characteristics of the $B_L$ signal. As exemplified in the figure, the infrared light components IR are removed to a certain extent in all of the color signals.

Figure 7:
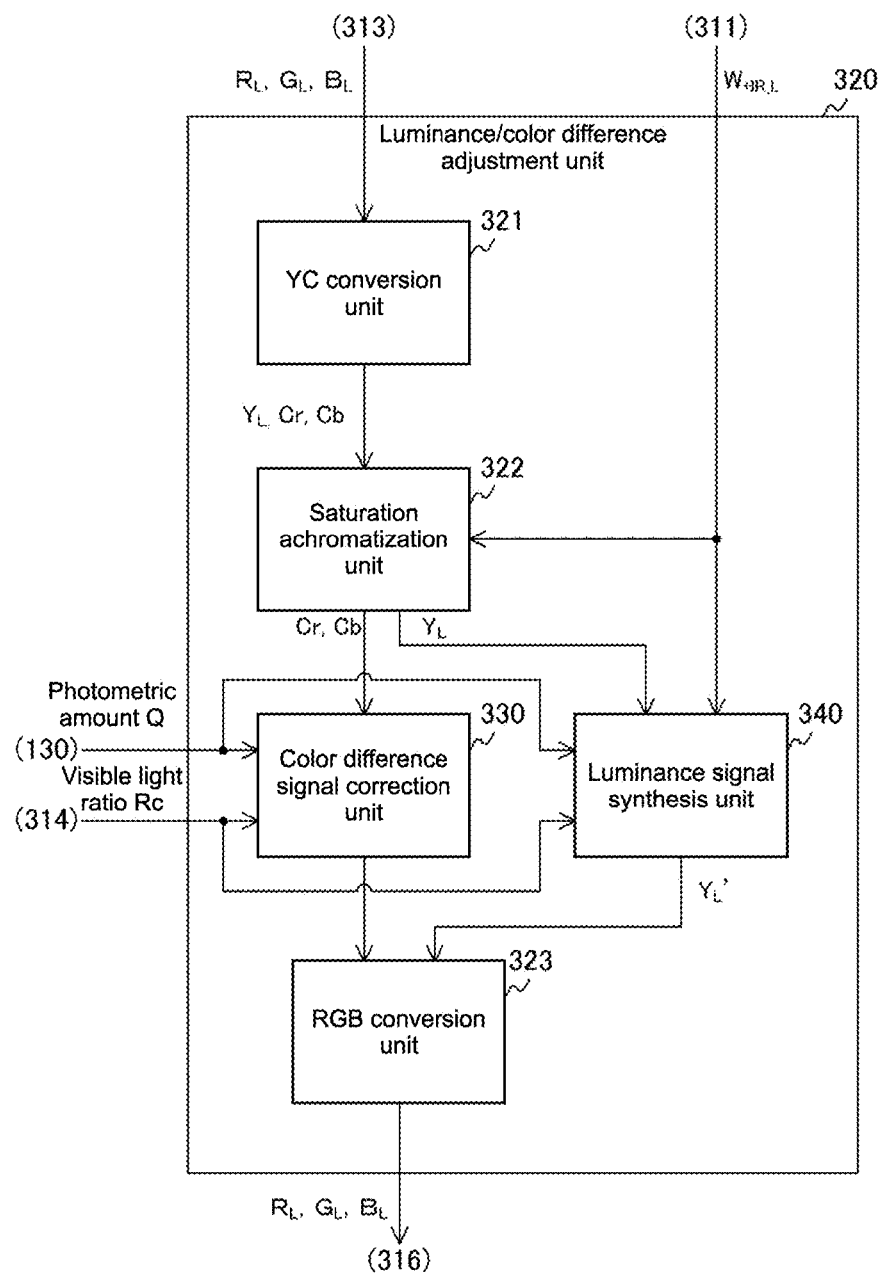
FIG. 7 A block diagram showing a configuration example of a luminance/color difference adjustment unit according to the first embodiment.

FIG. 7 is a block diagram showing a configuration example of the luminance/color difference adjustment unit 320 according to the first embodiment. The luminance/color difference adjustment unit 320 includes a YC conversion unit 321, a saturation achromatization unit 322, a color difference signal correction unit 330, a luminance signal synthesis unit 340, and an RGB conversion unit 323.

The YC conversion unit 321 converts, for each pixel, the $R_L$, $G_L$, and $B_L$ signals into a luminance signal $Y_L$ and color difference signals Cr and Cb. The YC conversion unit 321 converts signals using the following expressions based on an ITU-R (International Telecommunication Union Radiocommunication Sector) BT.601 standard, for example. The YC conversion unit 321 supplies the luminance signal $Y_L$ and color difference signals Cr and Cb to the saturation achromatization unit 322.

$$Y_L = 0.299 \times R_L + 0.587 \times G_L + 0.144 \times B_L$$

$$Cb = -0.168736 \times R_L - 0.331264 \times G_L + 0.5 \times B_L$$

$$Cr = 0.5 \times R_L - 0.418688 \times G_L - 0.081312 \times B_L$$

The saturation achromatization unit 322 is used for preventing, when any of the input signals (R+IR, G+IR, B+IR, W+IR) is saturated, an erroneous color from being obtained due to the IR separation not being performed correctly. As the saturation level, a W+IR_L signal level is used, for example. When the W+IR_L signal level exceeds the saturation level, the saturation achromatization unit 322 multiplies that signal by a gain smaller than 1 to achromatize for the saturated amount. The saturation achromatization unit 322 supplies the achromatized color difference signals Cr and Cb to the color difference signal correction unit 330 and the achromatized luminance signal YL to the luminance signal synthesis unit 340.

The color difference signal correction unit 330 corrects the color difference signals Cr and Cb based on the photometric amount Q and the visible light ratio Rc. The color difference signal correction unit 330 sets a chroma gain Gc, performs a correction in which each of the color difference signals Cr and Cb is multiplied by that gain, and supplies the signals to the RGB conversion unit 323. The method of setting a chroma gain will be described later in detail.

The luminance signal synthesis unit 340 determines a synthesis ratio based on the photometric amount Q and the visible light ratio Rc and synthesizes the luminance signal YL with the color signal W+IR_L by that synthesis ratio. The luminance signal synthesis unit 340 sets the synthesis ratio, synthesizes the luminance signal YL with the color signal W+IR_L by that ratio using the following expression to generate a luminance signal YL', and supplies the signal to the RGB conversion unit 323. The method of setting a synthesis ratio will be described later in detail.

$$Y_L' = \alpha \times Y_L + (1-\alpha) \times W_{+IR\_L} \ldots \quad \text{Expression 7}$$

In the expression above, $t_l$, $a_l$, and $b_l$ are each a coefficient of an actual number.

The RGB conversion unit 323 converts, for each pixel, the luminance signal and color difference signals into the $R_L$, $G_L$, and $B_L$ signals and supplies the signals to the high frequency component restoration unit 316. The RGB conversion unit 323 converts signals based on the ITU-R BT.601 standard using the following expressions, for example. It should be noted that the RGB conversion unit 323 is an example of the reverse conversion unit described in the scope of claims.

$$R_L = Y_L' + 1.402 \times Cr$$

$$G_L = Y_L' - 0.344136 \times Cr - 0.714136 \times Cb$$

$$B_L = Y_L' + 1.772 \times Cb$$

Figure 8:
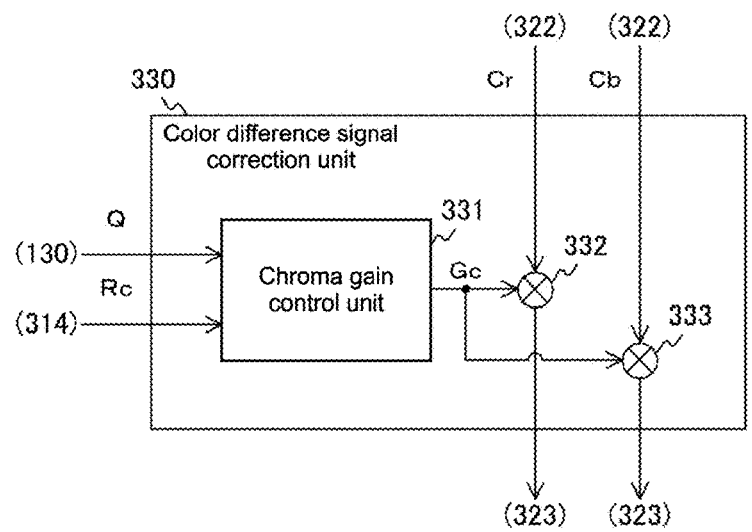
FIG. 8 A block diagram showing a configuration example of a color difference signal correction unit according to the first embodiment.

FIG. 8 is a block diagram showing a configuration example of the color difference signal correction unit 330 according to the first embodiment. The color difference signal correction unit 330 includes a chroma gain control unit 331 and multipliers 332 and 333.

The chroma gain control unit 331 controls the chroma gain Gc as a gain to be multiplied by the color signals based on the photometric amount Q and the visible light ratio Rc. The chroma gain control unit 331 determines the chroma gain Gc using Expression 21, for example, and supplies it to the multipliers 332 and 333. It should be noted that although the chroma gain control unit 331 is provided in the image processing unit 300, the chroma gain control unit 331 may instead be provided in the control unit 120.

The multiplier 332 multiplies the color difference signal Cr by the chroma gain Gc and supplies it to the RGB conversion unit 323. The multiplier 333 multiplies the color difference signal Cb by the chroma gain Gc and supplies it to the RGB conversion unit 323.

Figure 9:
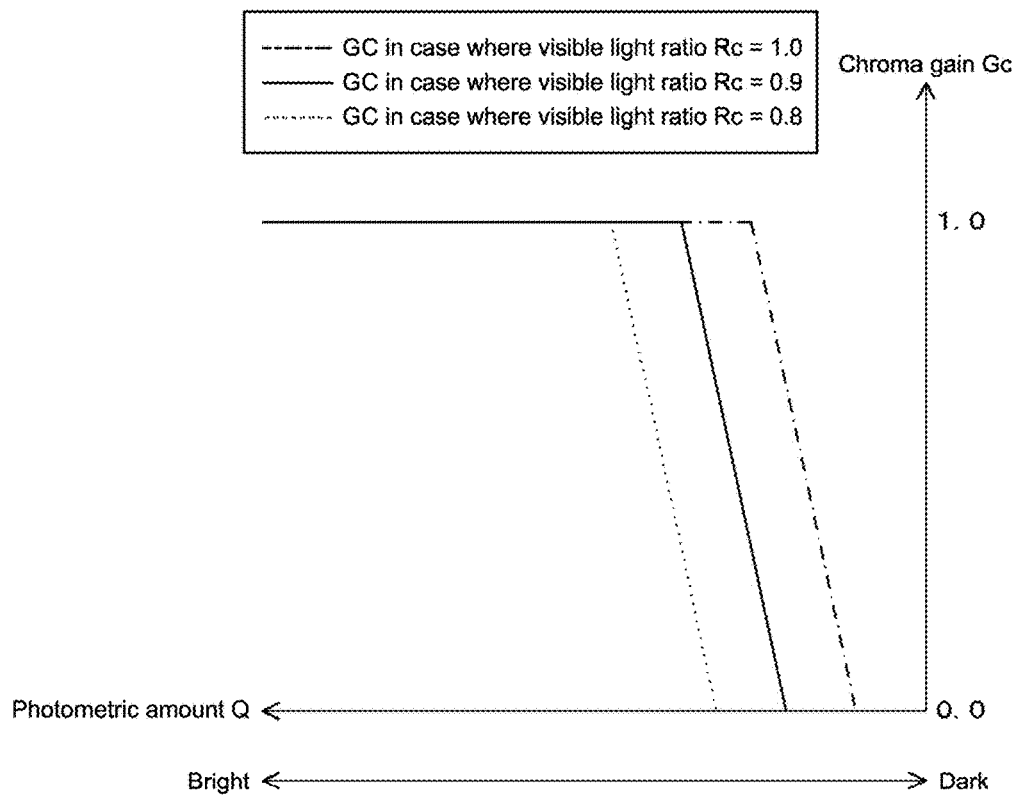
FIG. 9 A graph showing a setting example of a chroma gain according to the first embodiment.

FIG. 9 is a graph showing a setting example of the chroma gain Gc according to the first embodiment. In the figure, the ordinate axis represents the chroma gain Gc, and the abscissa axis represents the photometric amount Q. Also in the figure, the dashed-dotted line shows a setting example of the chroma gain Gc in a case where the visible light ratio Rc is 1.0, and the solid line shows a setting example of the chroma gain Gc in a case where the visible light ratio Rc is 0.9. In addition, the dotted line shows a setting example of the chroma gain Gc in a case where the visible light ratio Rc is 0.8. As exemplified in the figure, the smaller the photometric amount Q is and the higher the visible light ratio Rc is (i.e., high ratio of IR components), the smaller the chroma gain Gc to be set is. As a result, as the periphery of the image pickup apparatus 100 becomes darker or the ratio of IR components becomes higher, it becomes possible to favorably maintain an SN (Signal-to-Noise) ratio of image signals by making an image approach a monochrome image.

Figure 10:
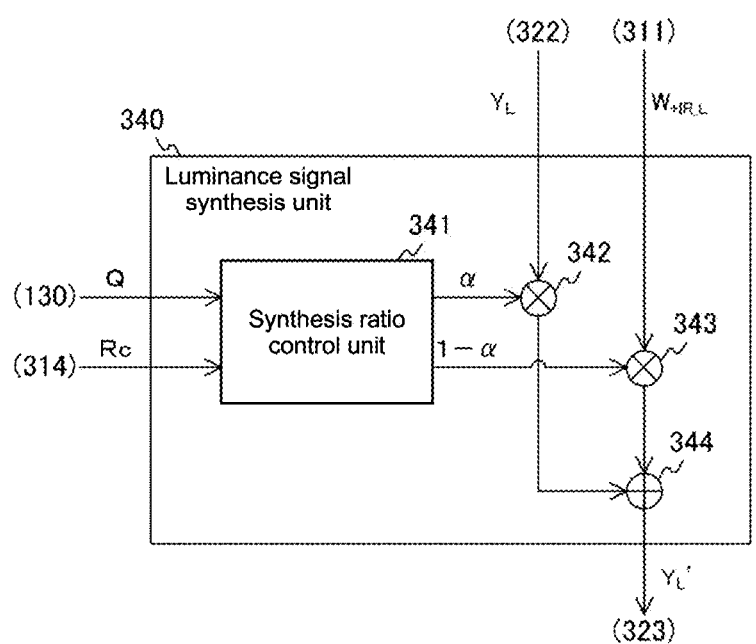
FIG. 10 A block diagram showing a configuration example of a luminance signal synthesis unit according to the first embodiment.

FIG. 10 is a block diagram showing a configuration example of the luminance signal synthesis unit 340 according to the first embodiment. The luminance signal synthesis unit 340 includes a synthesis ratio control unit 341, multipliers 342 and 343, and an adder 344.

The synthesis ratio control unit 341 controls a synthesis ratio based on the photometric amount Q and the visible light ratio Rc. The synthesis ratio control unit 341 determines a synthesis ratio using Expression 22, for example, supplies the synthesis ratio to the multiplier 342, and supplies a subtraction result obtained by subtracting the synthesis ratio from "1" to the multiplier 343. It should be noted that although the synthesis ratio control unit 341 is provided in the image processing unit 300, the synthesis ratio control unit 341 may instead be provided in the control unit 120.

The multiplier 342 multiplies the synthesis ratio by the luminance signal $Y_L$ and supplies the multiplication result to the adder 344. The multiplier 343 multiplies the subtraction result from the synthesis ratio control unit 341 by the $W_{+IR\_L}$ signal and supplies the multiplication result to the adder 344. The adder 344 adds the multiplication results supplied from the multipliers 342 and 343 and supplies the addition result to the RGB conversion unit 323 as a luminance signal YL'.

Figure 11:
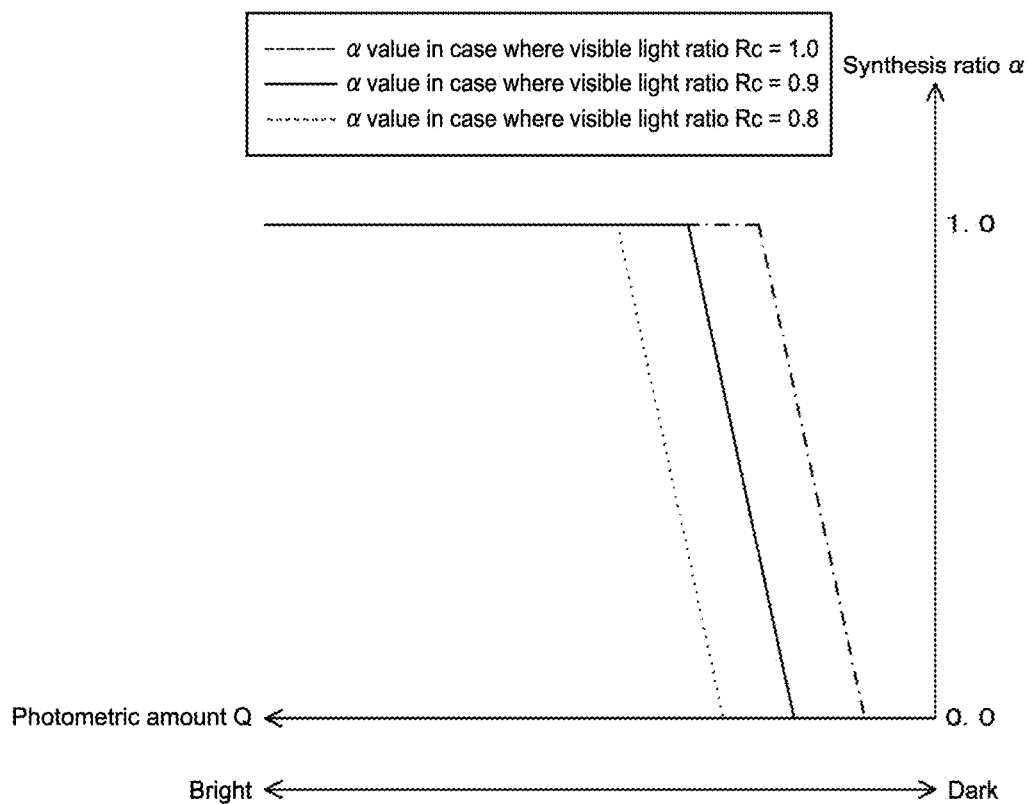
FIG. 11 A graph showing a setting example of a synthesis ratio according to the first embodiment.

FIG. 11 is a graph showing a setting example of the synthesis ratio according to the first embodiment. In the figure, the ordinate axis represents the synthesis ratio, and the abscissa axis represents the photometric amount Q. Also in the figure, the dashed-dotted line shows a setting example of the synthesis ratio in a case where the visible light ratio Rc is 1.0, and the solid line shows a setting example of the synthesis ratio in a case where the visible light ratio Rc is 0.9. In addition, the dotted line shows a setting example of the synthesis ratio in a case where the visible light ratio Rc is 0.8. As exemplified in the figure, the smaller the photometric amount Q is and the higher the ratio of IR components is, the smaller the synthesis ratio to be set is. As a result, as the periphery of the image pickup apparatus 100 becomes darker or the ratio of IR components becomes higher, the ratio of W+IR_L signals with a favorable SN ratio can be made higher. Therefore, image quality can be improved.

[Configuration Example of Signal Processing Unit]

Figure 12:
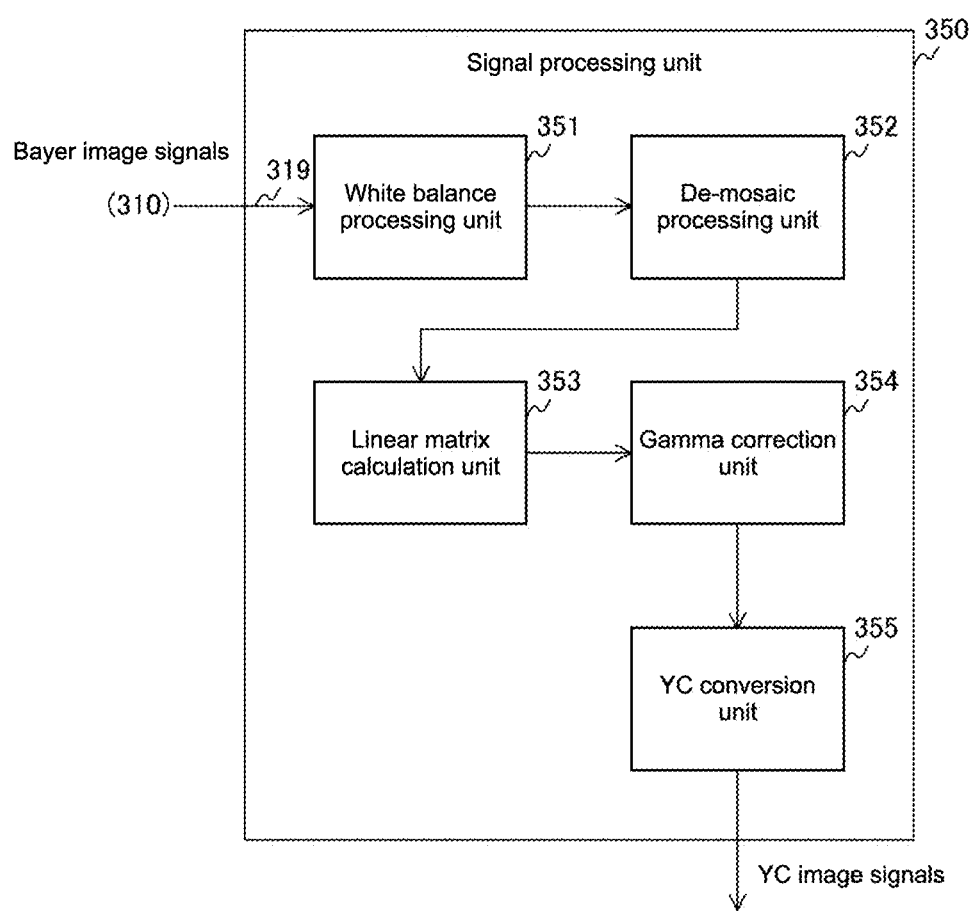
FIG. 12 A block diagram showing a configuration example of a signal processing unit according to the first embodiment.

FIG. 12 is a block diagram showing a configuration example of the signal processing unit 350 according to the first embodiment. The signal processing unit 350 includes a white balance processing unit 351, a de-mosaic processing unit 352, a linear matrix calculation unit 353, a gamma correction unit 354, and a YC conversion unit 355.

The white balance processing unit 351 corrects a white balance in the Bayer image signals. The white balance processing unit 351 adjusts the white balance by multiplying each of the R and B signals by a gain, for example. The white balance processing unit 351 supplies the Bayer image signals with the adjusted white balance to the de-mosaic processing unit 352.

The de-mosaic processing unit 352 uses a predetermined de-mosaic algorithm to convert the Bayer image signals into de-mosaic image signals including the R, G, and B signals for each of the image signals. The de-mosaic processing unit 352 supplies the de-mosaic image signals obtained by the conversion to the linear matrix calculation unit 353.

The linear matrix calculation unit 353 carries out a linear matrix calculation for enhancing color reproducibility. The linear matrix calculation unit 353 carries out the linear matrix calculations expressed by the following expressions, for example.

$$R' = R + k_a \times (R-G) + k_b \times (R-G)$$

$$G' = R + k_c \times (G-R) + k_d \times (G-B)$$

$$B' = B + k_e \times (B-R) + k_f \times (B-G)$$

In the expressions above, $k_a$, $k_b$, $k_c$, $k_d$, $k_e$, and $k_f$ are each a coefficient of an actual number.

The linear matrix calculation unit 353 supplies the calculated R', G', and B' signals to the gamma correction unit 354. The signal levels of the luminance signal and color difference signals change due to the linear matrix calculation. Therefore, it is desirable to perform the correction of color signals in the color difference signal correction unit 330 and the synthesis of a luminance signal in the luminance signal synthesis unit 340 before the linear matrix calculation. By carrying out the correction and synthesis in the Bayer unit 310 as described above, image quality can be improved.

The gamma correction unit 354 carries out gamma correction according to display characteristics. The gamma correction unit 354 supplies the corrected de-mosaic image signals to the YC conversion unit 355.

The YC conversion unit 355 converts, in the de-mosaic image signals, the R', G', and B' signals into a luminance signal and color difference signals. The YC conversion unit 355 performs the conversion using Expressions 19 to 21, for example, and outputs the converted image signals as YC image signals.

Figure 13:
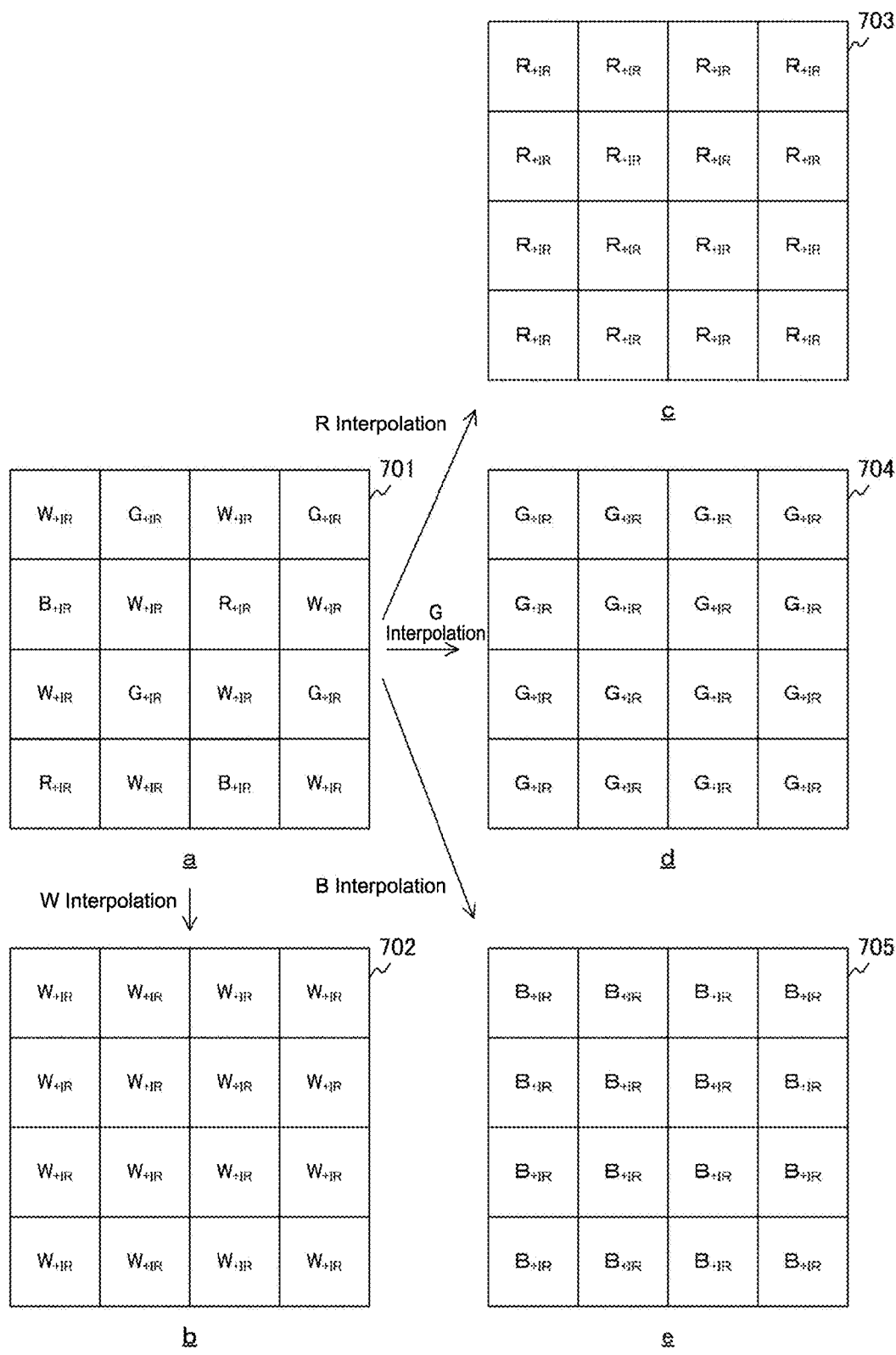
FIG. 13 Diagrams showing examples of image signals before and after interpolation according to the first embodiment.

FIG. 13 are diagrams showing examples of image signals before and after interpolation according to the first embodiment. FIG. 13a is a diagram showing an example of an RGBW image signal 701. As shown in FIG. 13a, in the RGBW image signal 701, the $R_{+IR}$, $G_{+IR}$, $B_{+IR}$, and $W_{+IR}$ signals are arranged in an array different from the Bayer array.

FIG. 13b is a diagram showing an example of data 702 constituted of interpolated $W_{+IR\_L}$ signals. FIG. 13c is a diagram showing an example of data 703 constituted of interpolated $R_{+IR\_L}$ signals. FIG. 13d is a diagram showing an example of data 704 constituted of interpolated $G_{+IR\_L}$ signals. FIG. 13e is a diagram showing an example of data 705 constituted of interpolated $B_{+IR\_L}$ signals. As shown in FIGS. 13b, c, d, and e, all color signals are interpolated for each pixel.

Figure 14:
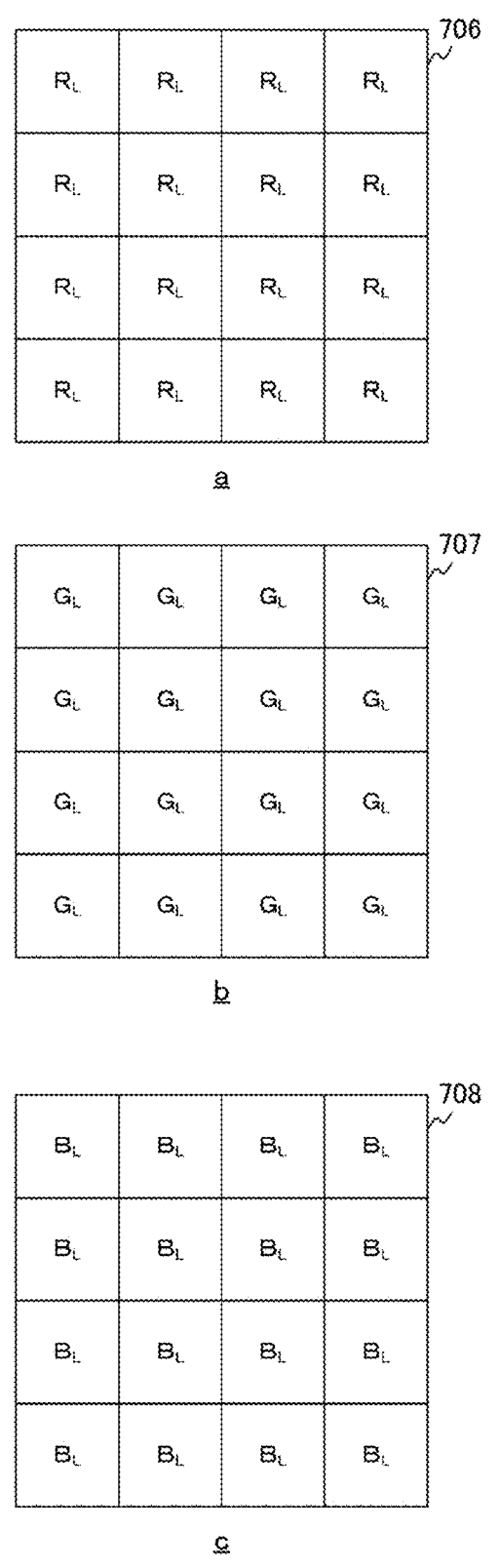

FIG. 14 are diagrams showing examples of color signals obtained after infrared light separation according to the first embodiment. FIG. 14a is a diagram showing an example of data 706 constituted of $R_L$ signals obtained after infrared light separation. FIG. 14b is a diagram showing an example of data 707 constituted of $G_L$ signals obtained after infrared light separation. FIG. 14c is a diagram showing an example of data 708 constituted of $B_L$ signals obtained after infrared light separation. As shown in the figures, infrared light components are removed from each of the color signals.

Figure 15:
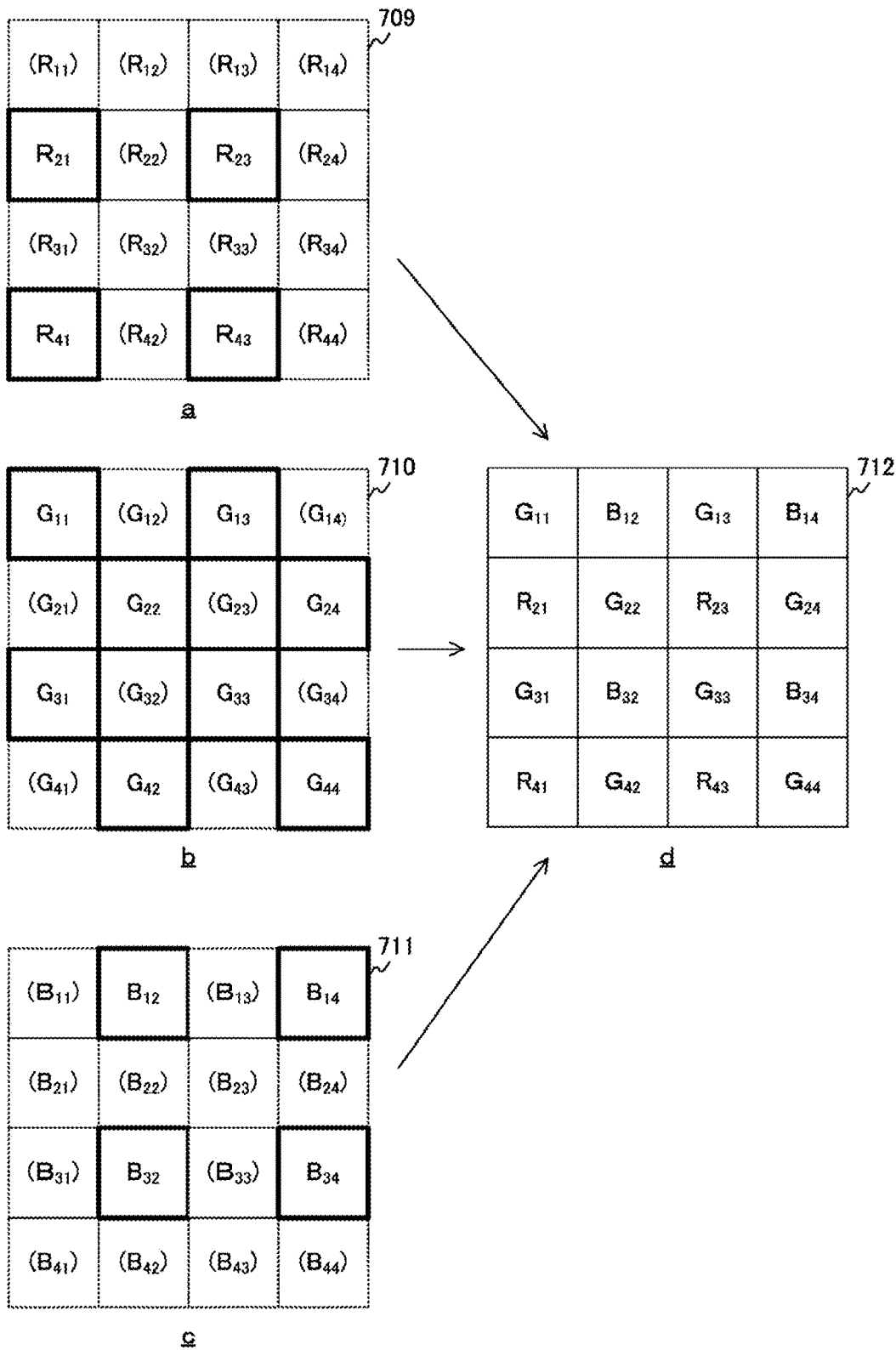
FIG. 15 Diagrams showing examples of image signals before and after signals are arranged in a Bayer array in the first embodiment.

FIG. 15 are diagrams showing examples of image signals before and after signals are arranged in the Bayer array in the first embodiment. FIG. 15a is a diagram showing an example of data 709 constituted of R signals obtained after restoring high frequency components. FIG. 15b is a diagram showing an example of data 710 constituted of G signals obtained after restoring high frequency components. FIG. 15c is a diagram showing an example of data 711 constituted of B signals obtained after restoring high frequency components. In FIGS. 15a, b, and c, suffixes of the R, G, and B signals respectively indicate positions in rows and columns where the pixel signals are arranged. For example, the R signal in a first row, first column is noted as $R_{11}$, and the R signal in a first row, second column is noted as $R_{12}$.

FIG. 15d is a diagram showing an example of a Bayer image signal 712. The R, G, and B signals for which the high frequency components have been restored are arranged in the Bayer array so as to generate a Bayer image. For example, of the 4*4 R signals exemplified in FIG. 15a, R21, R23, R41, and R43 are selected and arranged without changing positions in the rows and columns in the Bayer image signal.

Further, for example, of the 4*4 G signals exemplified in FIG. 15b, $G_{11}$, $G_{13}$, $G_{22}$, $G_{24}$, $G_{33}$, $G_{33}$, $G_{42}$, and $G_{44}$ are selected and arranged without changing positions in the rows and columns in the Bayer image signal. Further, for example, of the 4*4 B signals exemplified in FIG. 15c, $B_{12}$, $B_{14}$, $B_{32}$, and $B_{34}$ are selected and arranged without changing positions in the rows and columns in the Bayer image signal. As a result, the Bayer image signal 712 in which the R, G, and B signals are arranged in the Bayer array is generated.

Figure 16:
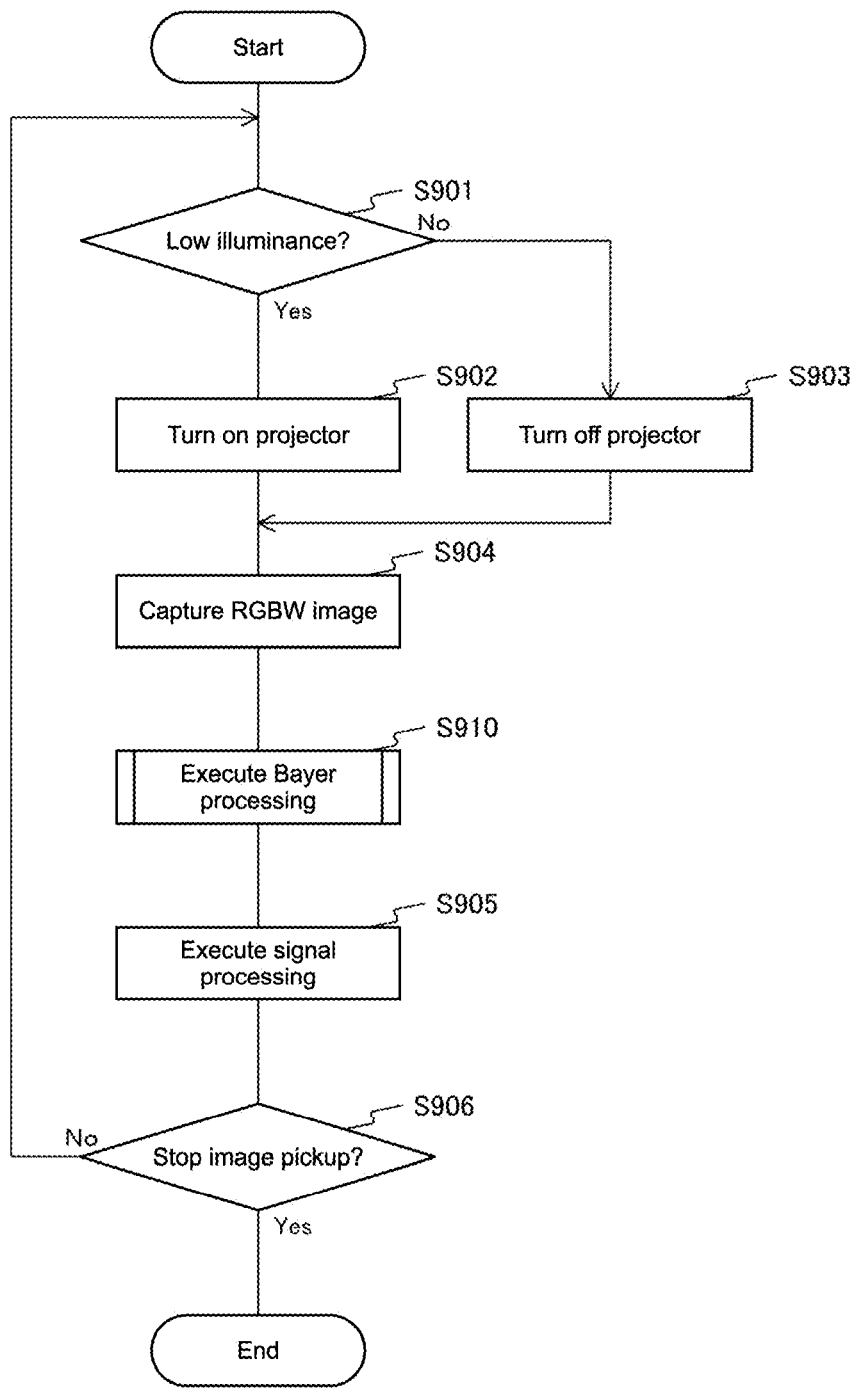
FIG. 16 A flowchart showing an example of an operation of the image pickup apparatus according to the first embodiment.

FIG. 16 is a flowchart showing an example of an operation of the image pickup apparatus 100 according to the first embodiment. This operation is started when a user makes an operation of starting image pickup (pressing of shutter button etc.), for example. The image pickup apparatus 100 compares a photometric amount Q with a predetermined threshold value and determines whether the photometric amount is smaller than the threshold value and illuminance is low (Step S901). When the illuminance is low (Step S901: Yes), the image pickup apparatus 100 turns on the infrared light projector 110 (Step S902). On the other hand, when the illuminance is not low (Step S901: No), the image pickup apparatus 100 turns off the infrared light projector 110 (Step S903).

After Step S902 or S903, the image pickup apparatus 100 captures an RGBW image (Step S904). Then, the image pickup apparatus 100 carries out Bayer processing of converting the RGBW image into a Bayer image (Step S910) and carries out predetermined signal processing on the Bayer image (Step S905).

Then, the image pickup apparatus 100 determines whether to stop image pickup (Step S906). For example, the image pickup is stopped when a predetermined user operation is made or when a time during which image pickup is to be continued ends. When determined as not stopping image pickup, (Step S906: No), the image pickup apparatus 100 returns to Step S901. On the other hand, when stopping image pickup (Step S906: Yes), the image pickup apparatus 100 ends the image pickup operation.

Figure 17:
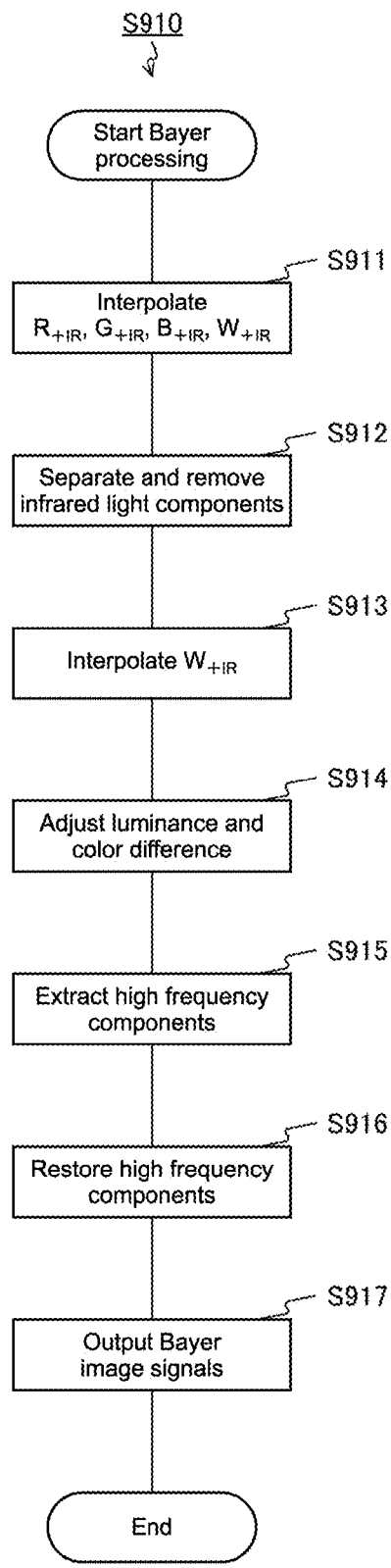
FIG. 17 A flowchart showing Bayer processing according to the first embodiment.

FIG. 17 is a flowchart showing Bayer processing according to the first embodiment. The image pickup apparatus 100 interpolates, in the RGBW image signals, the $R_{+IR}$, $G_{+IR}$, $B_{+IR}$, and $W_{+IR}$ signals for each pixel signal (Step S911). Then, the image pickup apparatus 100 separates and removes infrared light components in the RGBW image signals in which the color signals are interpolated (Step S912). Further, the image pickup apparatus 100 interpolates the $W_{+IR}$ signal for each pixel signal in the RGBW image signals (Step S913).

Then, the image pickup apparatus 100 adjusts a luminance signal and color difference signals based on the visible light ratio and the photometric amount (Step S914). The image pickup apparatus 100 extracts high frequency components using the interpolated $W_{+IR}$ signals (Step S915) and restores the high frequency components in the image signals from which the infrared light components have been separated (Step S916). Then, the image pickup apparatus 100 generates Bayer image signals from the image signals in which the high frequency components are restored (Step S917). After Step S917, the image pickup apparatus 100 ends the Bayer processing.

As described above, according to the first embodiment of the present technology, it becomes unnecessary to change design of the signal processing unit that processes Bayer image signals for removing infrared light components from pixel signals in the RGBW image signals and generating Bayer image signals in a Bayer array. As a result, design and development of an apparatus that processes images can be facilitated.

<2. Second Embodiment>

Although the respective configurations of the image pickup device 200 and the Bayer unit 310 are provided on different semiconductor chips in the first embodiment, those may be provided on the same semiconductor chip as one chip. The image pickup apparatus 100 according to a second embodiment differs from that of the first embodiment in that the respective configurations of the image pickup device 200 and the Bayer unit 310 are provided on one chip.

Figure 18:
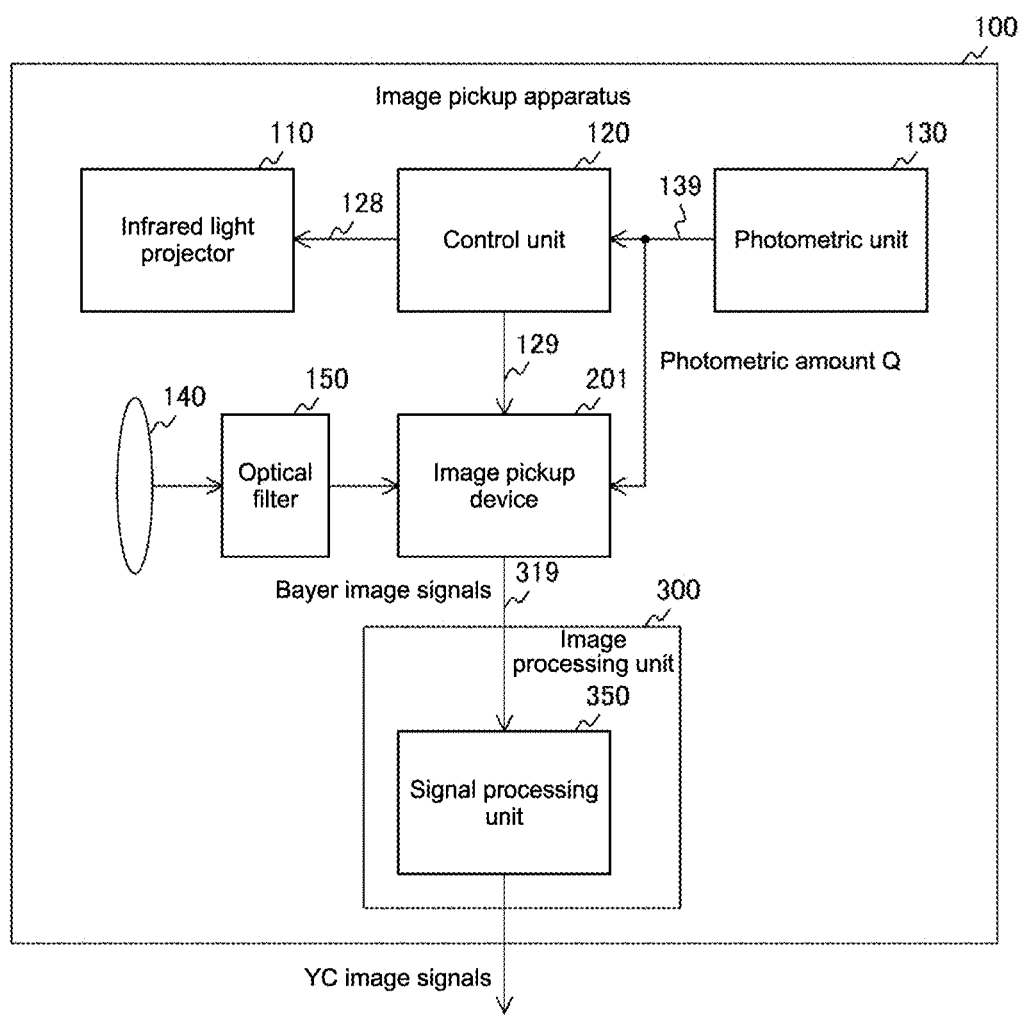
FIG. 18 A block diagram showing a configuration example of an image pickup apparatus according to a second embodiment.

FIG. 18 is a block diagram showing a configuration example of the image pickup apparatus 100 according to the second embodiment. The image pickup apparatus 100 of the second embodiment differs from that of the first embodiment in that the Bayer unit 310 is not provided in the image processing unit 300 and an image pickup device 201 is provided in place of the image pickup device 200.

The image pickup device 201 differs from that of the first embodiment in that it includes the Bayer unit 310 therein so that RGBW image signals are converted into Bayer image signals and then supplied to the signal processing unit 350.

Figure 19:
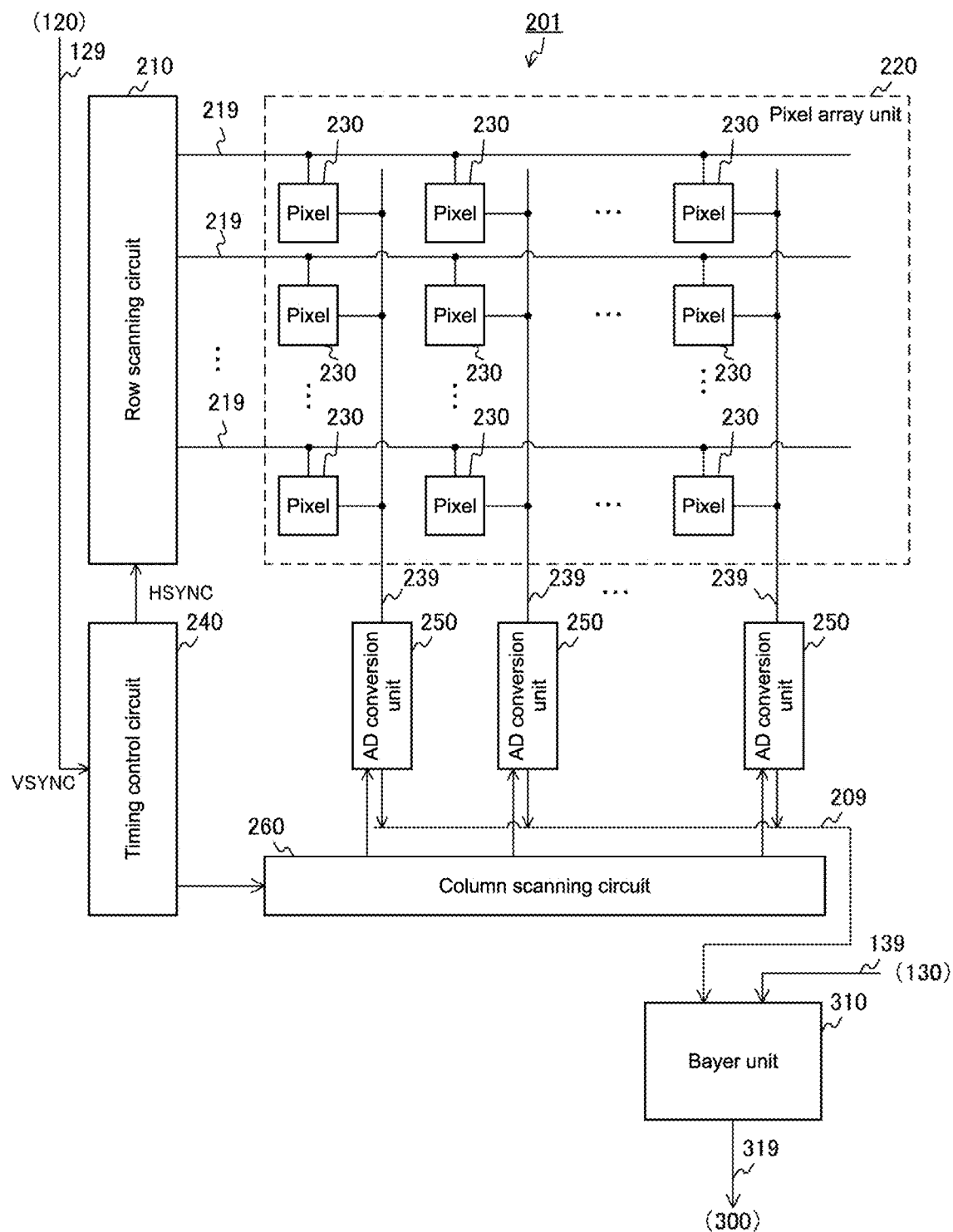
FIG. 19 A block diagram showing a configuration example of an image pickup device according to the second embodiment.

FIG. 19 is a block diagram showing a configuration example of the image pickup device 201 according to the second embodiment. The image pickup device 201 differs from the image pickup device 200 of the first embodiment in that it further includes the Bayer unit 310.

It should be noted that circuits of the image pickup device 201 including the row scanning circuit 210, the pixel array unit 220, the timing control circuit 240, the AD conversion units 250, and the column scanning circuit 260 are an example of the image pickup unit described in the scope of claims.

As described above, according to the second embodiment of the present technology, since the removal of infrared light and the conversion into Bayer image signals are carried out in the image pickup device, the function of removing infrared light can be mounted on the image pickup apparatus with only the image pickup device.

<3. Third Embodiment>

Although the respective configurations of the image pickup device 200 and the image processing unit 300 are provided on different semiconductor chips in the first embodiment, those may be provided on the same semiconductor chip as one chip. The image pickup apparatus 100 according to a third embodiment differs from that of the first embodiment in that the respective configurations of the image pickup device 200 and the image processing unit 300 are provided on one chip.

Figure 20:
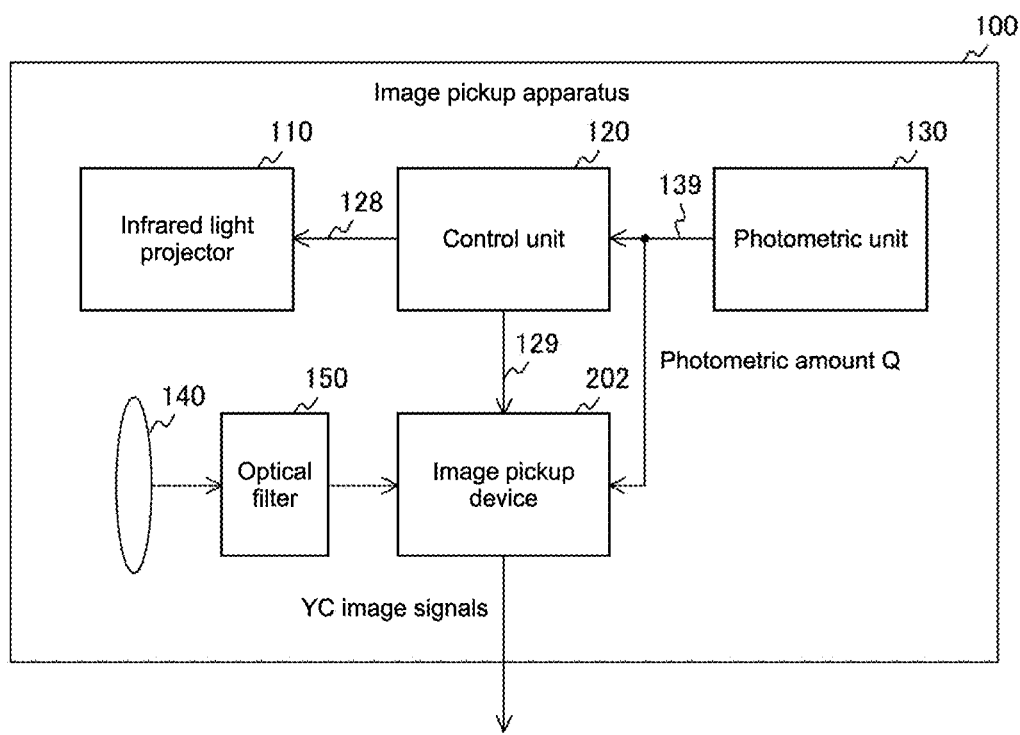
FIG. 20 A block diagram showing a configuration example of an image pickup apparatus according to a third embodiment.

FIG. 20 is a block diagram showing a configuration example of the image pickup apparatus 100 according to the third embodiment. The image pickup apparatus 100 of the third embodiment differs from that of the first embodiment in that an image pickup device 202 is provided in place of the image pickup device 200 and the image processing unit 300 is not provided outside the image pickup device 202.

The image pickup device 202 differs from that of the first embodiment in that it includes the image processing unit 300 therein so that RGBW image signals are converted into YC image signals to be output.

Figure 21:
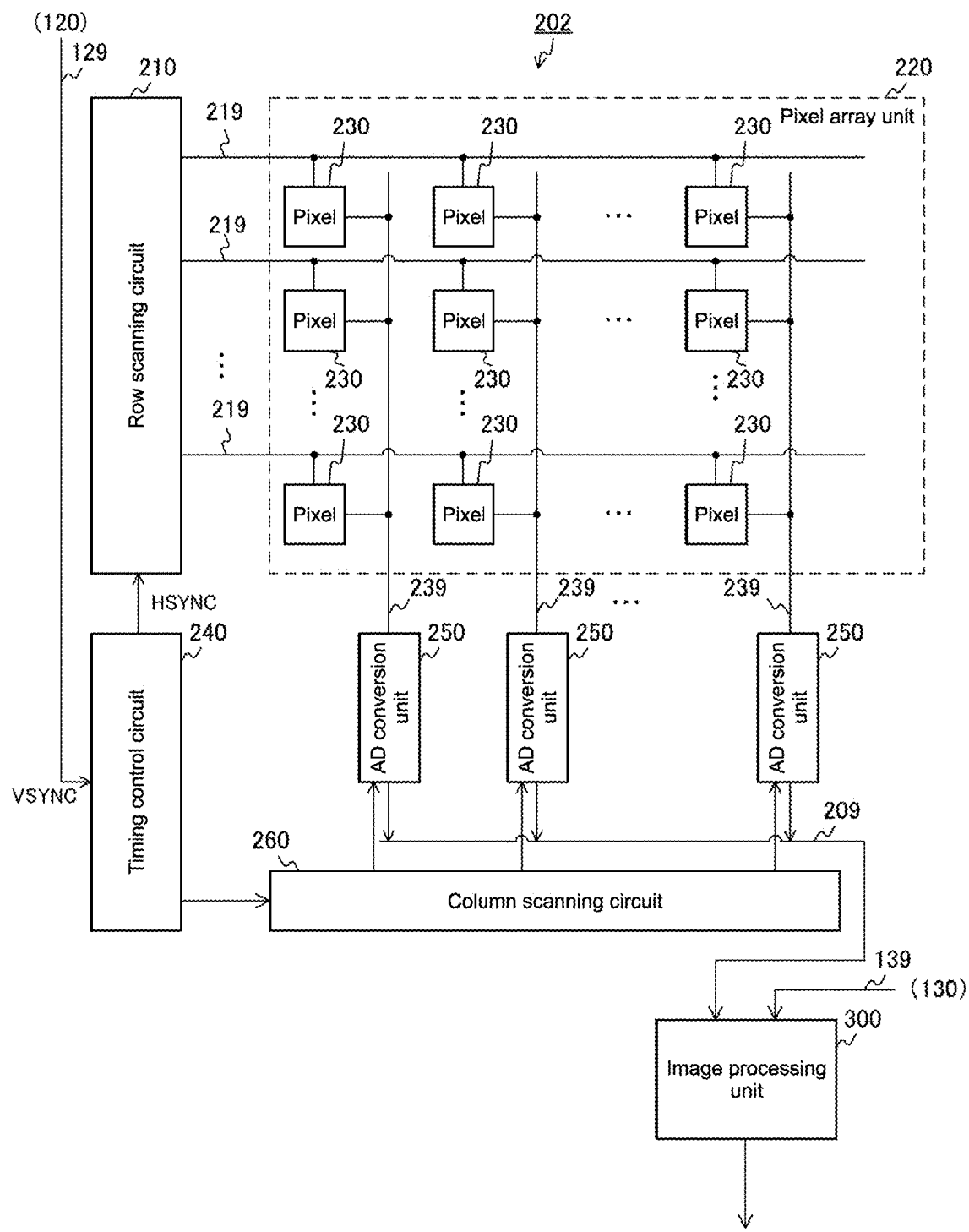
FIG. 21 A block diagram showing a configuration example of an image pickup device according to the third embodiment.

FIG. 21 is a block diagram showing a configuration example of the image pickup device 202 according to the third embodiment. The image pickup device 201 differs from the image pickup device 200 of the first embodiment in that it further includes the image processing unit 300.

It should be noted that circuits of the image pickup device 202 including the row scanning circuit 210, the pixel array unit 220, the timing control circuit 240, the AD conversion units 250, and the column scanning circuit 260 are an example of the image pickup unit described in the scope of claims.

As described above, according to the third embodiment of the present technology, since the processing of converting RGBW image signals into YC image signals is carried out in the image pickup device, the function of converting RGBW image signals into YC image signals can be mounted on the image pickup apparatus with only the image pickup device.

It should be noted that the embodiments above show examples for embodying the present technology, and the matters of the embodiments respectively have correspondence relationships with the specific matters of the invention described in the scope of claims. Similarly, the specific matters of the invention described in the scope of claims respectively have correspondence relationships with the matters of the embodiments of the present technology having the same names. However, the present technology is not limited to the embodiments above and can be variously modified without departing from the gist of the present technology.

Further, the processing procedures described in the embodiments above may be considered as a method including the series of procedures described above or may be considered as a program for causing a computer to execute the series of procedures or a recording medium that stores that program. Examples of the recording medium include a CD (Compact Disc), an MD (MiniDisc), a DVD (Digital Versatile Disc), a memory card, and a Blu-ray disc (Blu-ray (registered trademark) disc).

It should be noted that the effects described herein are not necessarily limited, and any effect described in the present disclosure may be obtained.

It should be noted that the present technology may also take the following configurations.

(1) An image processing apparatus, including:

a separation unit that separates and removes, in input image signals in which pixel signals each including an invisible light component are arranged in an array different from a Bayer array, the invisible light components from the pixel signals;

a Bayer image signal supply unit that arranges the pixel signals from which the invisible light components have been removed in the Bayer array and supplies the pixel signals as Bayer image signals; and a signal processing unit that subjects the Bayer image signals to predetermined signal processing.

(2) The image processing apparatus according to (1), in which the pixel signals each include one of a plurality of color signals, and the separation unit includes an all-color interpolation filter that sequentially focuses on the pixel signals in the input image signals and interpolates the plurality of color signals from a predetermined number of pixel signals in the periphery of the focused pixel signal, and an invisible light component separation unit that separates and removes the invisible light components by performing weighted addition of the plurality of color signals for each of the pixel signals in which the plurality of color signals are interpolated.

(3) The image processing apparatus according to (2), further including:

a specific color interpolation filter that sequentially focuses on the pixel signals in the input image signals and interpolates a specific color signal out of the plurality of color signals from the pixel signals smaller in number than the predetermined number of pixel signals in the periphery of the focused pixel signal;

a high frequency component extraction unit that extracts, as high frequency components, differences between the pixel signals in which the specific color signal is interpolated and the specific color signal in the pixel signals in which the plurality of color signals are interpolated; and a high frequency component restoration unit that restores the high frequency components in the pixel signals from which the invisible light components have been removed and supplies the pixel signals to the Bayer array image supply unit.

(4) The image processing apparatus according to (2) or (3), further including:

a YC conversion unit that converts, for each of the pixel signals from which the invisible light components have been removed, the plurality of color signals into a luminance signal and color difference signals;

a color difference signal correction unit that corrects the color difference signals by a gain corresponding to a photometric amount measured in the periphery of the image processing apparatus; and a reverse conversion unit that converts the corrected color difference signals and the luminance signal into the plurality of color signals and supplies the color signals to the Bayer image signal supply unit.

(5) The image processing apparatus according to any one of (2) to (4), further including:

a YC conversion unit that converts, for each of the pixel signals from which the invisible light components have been removed, the plurality of color signals into a luminance signal and color difference signals;

a luminance signal synthesis unit that synthesizes the specific color signal of the pixel signals in which the plurality of color signals are interpolated with the luminance signal by a synthesis ratio corresponding to a photometric amount measured in the periphery of the image processing apparatus; and a reverse conversion unit that converts the color difference signals and the luminance signal synthesized with the specific color signal into the plurality of color signals and supplies the color signals to the Bayer image signal supply unit.

(6) An image pickup device, including:

an image pickup unit that captures input image signals in which pixel signals each including an invisible light component are arranged in an array different from a Bayer array;

a separation unit that separates and removes the invisible light components from the pixel signals in the input image signals; and a Bayer image signal supply unit that arranges the pixel signals from which the invisible light components have been removed in the Bayer array and supplies the pixel signals as Bayer image signals.

(7) The image pickup device according to (6), further including a signal processing unit that subjects the Bayer image signals to predetermined signal processing.

(8) An image pickup apparatus, including:

an image pickup unit that captures input image signals in which pixel signals each including an invisible light component are arranged in an array different from a Bayer array;

a separation unit that separates and removes the invisible light components from the pixel signals in the input image signals;

a Bayer image signal supply unit that arranges the pixel signals from which the invisible light components have been removed in the Bayer array and supplies the pixel signals as Bayer image signals; and a signal processing unit that subjects the Bayer image signals to predetermined signal processing.

(9) An image processing method, including the steps of:

separating and removing, by a separation unit, in input image signals in which pixel signals each including an invisible light component are arranged in an array different from a Bayer array, the invisible light components from the pixel signals;

arranging, by a Bayer image signal supply unit, the pixel signals from which the invisible light components have been removed in the Bayer array and supplying the pixel signals as Bayer image signals; and subjecting, by a signal processing unit, the Bayer image signals to predetermined signal processing.

REFERENCE SIGNS LIST 100 image pickup apparatus
110 infrared light projector
120 control unit
130 photometric unit
140 image pickup lens
150 optical filter
200, 201, 202 image pickup device
210 row scanning circuit
220 pixel array unit
230 pixel
240 timing control circuit
250 AD conversion unit
260 column scanning circuit
300 image processing unit
310 Bayer unit
311 RGBW interpolation filter
312 W interpolation filter
313 infrared light separation unit
314 ratio calculation unit
315 high frequency component extraction unit
316 high frequency component restoration unit
317 Bayer image signal output unit
320 luminance/color difference adjustment unit
321, 355 YC conversion unit
322 saturation achromatization unit
323 RGB conversion unit
330 color difference signal correction unit
331 chroma gain control unit
332, 333, 342, 343 multiplier
340 luminance signal synthesis unit
341 synthesis ratio control unit
344 adder
350 signal processing unit
351 white balance processing unit
352 de-mosaic processing unit
353 linear matrix processing unit
354 gamma correction unit

The invention claimed is:

1. An image processing apparatus, comprising:
a separation unit that separates and removes, from input image signals in which pixel signals each including an invisible light component are arranged in an array different from a Bayer array, the invisible light components from the pixel signals to produce separated pixel signals, the invisible light components removed from the pixel signals including infrared light components;
a Bayer image signal supply unit that arranges the separated pixel signals and supplies the separated pixel signals as Bayer image signals; and a signal processing unit that subjects the Bayer image signals to a predetermined signal processing, wherein the pixel signals each include one of a plurality of color signals, and wherein the separation unit includes:
 an all-color interpolation filter that sequentially focuses on the pixel signals in the input image signals and interpolates the plurality of color signals from a predetermined number of pixel signals at a periphery of a focused pixel signal, and
 an invisible light component separation unit that separates and removes the invisible light components by performing a weighted addition of the plurality of color signals for each of the pixel signals in which the plurality of color signals are interpolated.

2. The image processing apparatus according to claim 1, further comprising:
 a specific color interpolation filter that sequentially focuses on the pixel signals in the input image signals and interpolates a specific color signal out of the plurality of color signals from a group of the pixel signals smaller in number than the predetermined number of pixel signals at the periphery of the focused pixel signal;
 a high frequency component extraction unit that extracts, as high frequency components, differences between the pixel signals in which the specific color signal is interpolated and the specific color signal in the pixel signals in which the plurality of color signals are interpolated; and
 a high frequency component restoration unit that restores the high frequency components in the separated pixel signals, to produce restored separated pixel signals, and supplies the restored separated pixel signals to the Bayer array image supply unit.

3. The image processing apparatus according to claim 1, further comprising:
 a YC conversion unit that converts, for each of the separated pixel signals, the plurality of color signals into a luminance signal and color difference signals;
 a color difference signal correction unit that corrects the color difference signals by a gain corresponding to a photometric amount measured at a periphery of the image processing apparatus to produce corrected color difference signals; and
 a reverse conversion unit that converts the corrected color difference signals and the luminance signal into a plurality of corrected color signals and supplies the corrected color signals to the Bayer image signal supply unit.

4. The image processing apparatus according to claim 1, further comprising:
 a YC conversion unit that converts, for each of the separated pixel signals, the plurality of color signals into a luminance signal and color difference signals;
 a luminance signal synthesis unit that synthesizes a specific color signal of the pixel signals in which the plurality of color signals are interpolated with the luminance signal by a synthesis ratio corresponding to a photometric amount measured at a periphery of the image processing apparatus; and
 a reverse conversion unit that converts the color difference signals and the luminance signal synthesized with the specific color signal into a plurality of corrected color signals and supplies the corrected color signals to the Bayer image signal supply unit.

5. An image pickup device, comprising:
 an image pickup unit that captures input image signals in which pixel signals each including an invisible light component are arranged in an array different from a Bayer array, the invisible light component including an infrared light component;
 a separation unit that separates and removes the invisible light components from the pixel signals in the input image signals, to produce separated pixel signals; and
 a Bayer image signal supply unit that arranges the separated pixel signals and supplies the separated pixel signals as Bayer image signals, wherein the pixel signals each include one of a plurality of color signals, and wherein the separation unit includes:
 an all-color interpolation filter that sequentially focuses on the pixel signals in the input image signals and interpolates the plurality of color signals from a predetermined number of pixel signals at a periphery of a focused pixel signal, and
 an invisible light component separation unit that separates and removes the invisible light components by performing a weighted addition of the plurality of color signals for each of the pixel signals in which the plurality of color signals are interpolated.

6. The image pickup device according to claim 5, further comprising
 a signal processing unit that subjects the Bayer image signals to predetermined signal processing.

7. An image pickup apparatus, comprising:
 an image pickup unit that captures input image signals in which pixel signals each including an invisible light component are arranged in an array different from a Bayer array, the invisible light component including an infrared light component;
 a separation unit that separates and removes the invisible light components from the pixel signals in the input image signals to produce separated pixel signals;
 a Bayer image signal supply unit that arranges the separated pixel signals and supplies the separated pixel signals as Bayer image signals; and
 a signal processing unit that subjects the Bayer image signals to a predetermined signal processing, wherein the pixel signals each include one of a plurality of color signals, and wherein the separation unit includes:
 an all-color interpolation filter that sequentially focuses on the pixel signals in the input image signals and interpolates the plurality of color signals from a predetermined number of pixel signals at a periphery of a focused pixel signal, and
 an invisible light component separation unit that separates and removes the invisible light components by performing a weighted addition of the plurality of color signals for each of the pixel signals in which the plurality of color signals are interpolated.

8. An image processing method, comprising steps of:
separating and removing, by a separation unit, from input image signals in which pixel signals each including an invisible light component are arranged in an array different from a Bayer array, the invisible light components from the pixel signals to produce separated pixel signals;
arranging, by a Bayer image signal supply unit, the separated pixel signals and supplying the separated pixel signals as Bayer image signals; and subjecting, by a signal processing unit, the Bayer image signals to a predetermined signal processing,
wherein the pixel signals each include one of a plurality of color signals, and
wherein the separating and removing includes:
    using an all-color interpolation filter to sequentially focus on the pixel signals in the input image signals and interpolate the plurality of color signals from a predetermined number of pixel signals at a periphery of a focused pixel signal, and
    performing a weighted addition of the plurality of color signals for each of the pixel signals in which the plurality of color signals are interpolated, to separate and remove the invisible light components.

* * * * *